(12) United States Patent
Li et al.

(10) Patent No.: US 10,193,737 B2
(45) Date of Patent: Jan. 29, 2019

(54) METHOD FOR PERFORMING COMMUNICATION BETWEEN BROWSER AND MOBILE TERMINAL, AND BROWSER APPARATUS

(71) Applicant: BEIJING QIHOO TECHNOLOGY COMPANY LIMITED, Beijing (CN)

(72) Inventors: Yu Li, Beijing (CN); Xinchao Tian, Beijing (CN); Xiaobing Yang, Beijing (CN); Fanlei Meng, Beijing (CN)

(73) Assignee: Beijing Qihoo Technology Company Limited, Beijing (CN)

( * ) Notice: Subject to any disclaimer, the term of this patent is extended or adjusted under 35 U.S.C. 154(b) by 0 days.

(21) Appl. No.: 15/537,849

(22) PCT Filed: Nov. 27, 2015

(86) PCT No.: PCT/CN2015/095804
§ 371 (c)(1),
(2) Date: Jun. 19, 2017

(87) PCT Pub. No.: WO2016/095686
PCT Pub. Date: Jun. 23, 2016

(65) Prior Publication Data
US 2017/0359213 A1    Dec. 14, 2017

(30) Foreign Application Priority Data

Dec. 19, 2014 (CN) .......................... 2014 1 0802571
Dec. 19, 2014 (CN) .......................... 2014 1 0805374

(51) Int. Cl.
*H04L 29/08* (2006.01)
*G06F 9/44* (2018.01)
(Continued)

(52) U.S. Cl.
CPC ............ *H04L 29/0809* (2013.01); *G06F 8/60* (2013.01); *G06F 9/44* (2013.01); *G06F 9/452* (2018.02);
(Continued)

(58) Field of Classification Search
CPC ....................................................... G06F 3/048
See application file for complete search history.

(56) References Cited

U.S. PATENT DOCUMENTS

| | | | |
|---|---|---|---|
| 2004/0216124 A1* | 10/2004 | Vadella | ................... G06F 9/543 719/310 |
| 2014/0053062 A1* | 2/2014 | Cahill | ............... G06F 17/30896 715/234 |
| 2014/0181888 A1* | 6/2014 | Li | ........................... G06F 21/62 726/1 |

FOREIGN PATENT DOCUMENTS

| | | |
|---|---|---|
| CN | 103269396 A | 8/2013 |
| CN | 103678505 A | 3/2014 |

(Continued)

OTHER PUBLICATIONS

International Patent Application No. PCT/CN2015/095804; Int'l Search Report; dated Mar. 1, 2016; 5 pages.

*Primary Examiner* — Pei Yong Weng
(74) *Attorney, Agent, or Firm* — Baker & Hostetler LLP

(57) ABSTRACT

A method for performing communication between a browser and a mobile terminal, and a browser apparatus. The method comprises: at a browser side, triggering a read request for reading storage data information or device information in a mobile terminal bound to the browser; starting a page process to load a preset page, the page process notifying a first process of the browser to establish a data communication channel with the mobile terminal; after the data communication channel is established, the page process notifying the first process of the browser to request the mobile (Continued)

terminal for the storage data information or the device information in the mobile terminal; and the page process acquiring the storage data information or the device information in the mobile terminal transmitted by the first process of the browser, and loading and displaying the storage data information or the device information on the preset page.

20 Claims, 13 Drawing Sheets

(51) Int. Cl.
  *G06F 17/30* (2006.01)
  *G06F 8/60* (2018.01)
  *G06F 9/451* (2018.01)

(52) U.S. Cl.
  CPC .. *G06F 17/30896* (2013.01); *G06F 17/30902* (2013.01); *H04L 67/02* (2013.01); *G06F 17/30864* (2013.01)

(56) References Cited

FOREIGN PATENT DOCUMENTS

| | | | |
|---|---|---|---|
| CN | 104008096 A | 8/2014 |
| CN | 104394237 A | 3/2015 |
| CN | 104461559 A | 3/2015 |

* cited by examiner

METHOD FOR PERFORMING COMMUNICATION BETWEEN BROWSER AND MOBILE TERMINAL, AND BROWSER APPARATUS

CROSS-REFERENCE TO RELATED APPLICATIONS

This application is the national stage of International Application No. PCT/CN2015/095804 filed Nov. 27, 2015, which claims the benefit of Chinese Patent Applications No. CN201410802571.7 and CN201410805374.0, both filed Dec. 19, 2014, the entire contents of which are incorporated herein by reference.

FIELD OF TECHNOLOGY

The present invention relates to the field of Internet technologies, and more particularly, to a method for performing communication between a browser and a mobile terminal, and a browser apparatus.

BACKGROUND

In the conventional technologies, data communication between browsers and mobile terminals needs the help of clients where the browsers are and USB data cables or WIFI. Users need to download applications at browser sides into clients where the browsers are, then the mobile terminals are connected to the clients where the browsers are via the USB data cables or WIFI so that the applications can be transferred to the mobile terminals. Direct data transmission is unavailable between the browsers and the mobile terminals. Furthermore, in the process of surfing the Internet to browse webpages, the users need to switch to program interfaces so as to view data storage information and/or device information in the mobile terminals, which causes cumbersome user operation.

SUMMARY

In view of the above problems, the present invention is proposed to provide a method for performing communication between a browser and a mobile terminal and relevant browser apparatus to overcome or at least partially solve the above problems.

According to an aspect of the present invention, there is provided a method for performing communication between a browser and a mobile terminal, comprising: at a browser side, triggering a read request for reading storage data information and/or device information in a mobile terminal bound to the browser; starting a page process to load a preset page, the page process notifying a first process of the browser to establish a data communication channel with the mobile terminal; after the data communication channel is established, notifying, by the page process, the first process of the browser to request the mobile terminal for the storage data information and/or the device information in the mobile terminal; and acquiring, by the page process, the storage data information and/or the device information in the mobile terminal transmitted by the first process of the browser, and loading and displaying the storage data information and/or the device information on the preset page.

According to another aspect of the present invention, there is provided a method for performing communication between a browser and a mobile terminal, wherein the browser carries out data communications with the mobile terminal by means of a first transmission tool program installed on a client-side where the browser is, and the method comprises: at a browser side, triggering a read request for reading storage data information and/or device information in a mobile terminal bound to the browser; starting a page process to load a preset page, the page process notifying a browser master program to establish a data communication channel with the first transmission tool program; after the data communication channel is established, notifying, by the page process, the browser master program to request the first transmission tool program for the storage data information and/or the device information in the mobile terminal; and acquiring, by the page process, the storage data information and/or the device information in the mobile terminal transmitted by the browser master program and returned by the first transmission tool program, and loading and displaying the storage data information and/or the device information on the preset page.

According to still another aspect of the present invention, there is provided a browser apparatus, comprising: a first process module configured to run a first process of the browser and a first page process module configured to run a page process.

The first process module is configured to: trigger, at a browser side, a read request for reading storage data information and/or device information in a mobile terminal bound to the browser; start a page process to load a preset page, and establish a data communication channel with the mobile terminal according to a notification of the page process module.

The first page process module comprises: a first invoking module, configured to notify the first process module to request the mobile terminal for the storage data information and/or the device information in the mobile terminal; a first acquiring module, configured to acquire the storage data information and/or the device information in the mobile terminal transmitted by the first process module; and a first loading module, configured to load and display the storage data information and/or the device information in the mobile terminal on the preset page.

According to still another aspect of the present invention, there is provided a browser apparatus. The browser apparatus carries out data communications with a mobile terminal by means of a first transmission tool program installed on a client-side where the browser apparatus is. The browser apparatus comprises: a master process module running a browser master program and a second page process module running a page process.

The master process module is configured to: trigger, at a browser side, a read request for reading storage data information and/or device information in a mobile terminal bound to the browser; start a page process to load a preset page, and establish a data communication channel with the mobile terminal according to a notification of the page process module.

The second page process module comprises: a second invoking module, configured to notify the master process module to request the first transmission tool program for the storage data information and/or the device information in the mobile terminal; a second acquiring module, configured to acquire the storage data information and/or the device information in the mobile terminal transmitted by the master process module and returned by the first transmission tool program; and a second loading module, configured to load and display the storage data information and/or the device information in the mobile terminal on the preset page.

According to still another aspect of the present invention, there is provided a computer program, which includes a computer-readable code. When the computer-readable code runs on a computer device, the computer device is caused to execute any one of the methods for performing communication between a browser and a mobile terminal.

According to still another aspect of the present invention, there is provided a computer-readable medium, in which the computer program is stored.

According to the solution provided by the present invention, the data communication channel between the browser and the mobile terminal is established using a preset page so that direct data transmission is available between the browser and the mobile terminal without the help of other auxiliary application programs. The browser may acquire the storage data information and/or the device information in the mobile terminal, and load and display the storage data information and/or the device information on the preset page so that a user may view. Through the method, when the user wants to view the storage data information and/or the device information in the mobile terminal in the process of surfing the Internet to browse webpages, the user does not need to switch the program interface and can directly view the storage data information and/or the device information on the preset page via a trigger button provided by the browser, so that the operation is convenient.

According to the solution provided by the present invention, the data communication channel between the browser and the first transmission tool program may be established using the preset page so that direct data transmission is available between the browser and the mobile terminal. The browser may acquire the storage data information and/or the device information in the mobile terminal returned by the first transmission tool program, and load and display the storage data information and/or the device information on the preset page so that the user may view. Through the method, when the user wants to view the storage data information and/or the device information in the mobile terminal in the process of surfing the Internet to browse webpages, the user does not need to switch the program interface and can directly view the storage data information and/or the device information on the preset page via a trigger button provided by the browser, so that the operation is convenient.

Described above is merely an overview of the technical solution of the present invention. In order to more apparently understand the technical means of the present invention to implement in accordance with the contents of specification, and to more readily understand above and other objectives, features and advantages of the present invention, specific embodiments of the present invention are provided hereinafter.

BRIEF DESCRIPTION OF THE DRAWINGS

Through reading the detailed description of the following preferred embodiments, various other advantages and benefits will become apparent to an ordinary person skilled in the art. Accompanying drawings are merely included for the purpose of illustrating the preferred embodiments and should not be considered as limiting of the present invention. Further, throughout the drawings, same elements are indicated by same reference numbers. In the drawings.

DESCRIPTION OF THE EMBODIMENTS

A further description of the present invention is made with reference to the accompanying drawings and specific embodiments hereinafter.

Exemplary embodiments of the present invention will be described in detail with reference to the accompanying figures hereinafter. Although the exemplary embodiments of the present invention are illustrated in the accompanying figures, it should be understood that the present invention may be embodied in many different forms and should not be construed as being limited to the embodiments set forth herein. Rather, these embodiments are provided so that this present invention will be understood thoroughly and completely and will fully convey the scope of the present invention to those skilled in the art.

A browser refers to a software that can display HTML file contents of web servers or file systems and allow users to interact with these files. A mobile terminal refers to a portable computer device such as a mobile phone, a notebook or a tablet computer.

In the present invention, direct data communication may be implemented between the browser and the mobile terminal without the help of any auxiliary application program. In the present invention, the browser side needs to be preconfigured and installed with an ADB component associated with an operating system of the mobile terminal, wherein the ADB component provides a plurality of DLL interfaces that can be invoked by the first process of the browser for implementing a designated function. After the ADB component is configured on the browser side, the browser may connect all Android devices by invoking the DLL interfaces in the ADB component for data communication.

The ADB (Android Debug Bridge) is a commonly-used debugging tool in Android SDK. By using this tool, an Android simulator or a real Android device (such as a Samsung mobile phone) may be directly operated and managed. Main functions of the ADB include: 1. Running a shell (command line) of a device; 2. managing port mapping of the simulator or device; 3. uploading/downloading files between a computer and the device; and 4. installing a local apk software in the simulator or the Android device.

The ADB is a client-server program, wherein the client-side program is installed in a PC for operation by a user, and the server-side program is installed in the Android device. In the present invention, the client-side program of the ADB is installed in the browser, and the server-side program of the ADB is installed in the mobile terminal.

Figure 1:
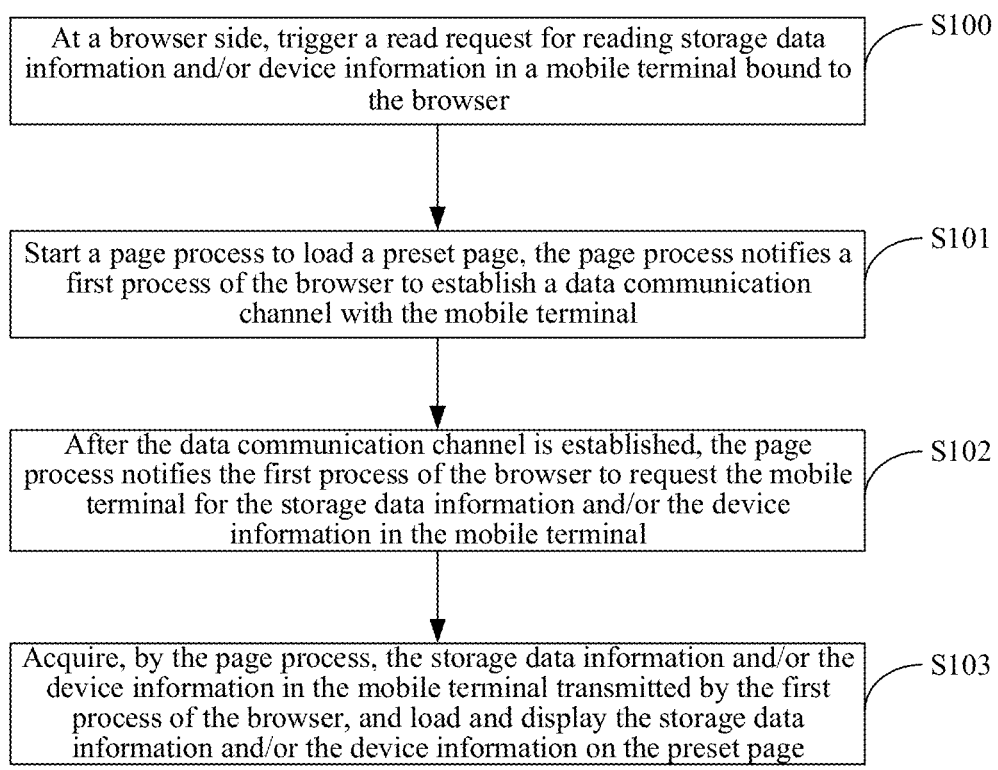
FIG. 1 is a flowchart of a method for performing communication between a browser and a mobile terminal according to an embodiment of the present invention.

FIG. 1 illustrates a flowchart of a method for performing communication between a browser and a mobile terminal according to an embodiment of the present invention. As shown in FIG. 1, the method includes following steps.

Step S100: at a browser side, triggering a read request for reading storage data information and/or device information in a mobile terminal bound to the browser.

Specifically, a browser interface comprises a trigger button of a mobile phone assistant. After the user starts the browser via the client side, by clicking the trigger button of the mobile phone assistant, the read request for reading storage data information and/or device information in the mobile terminal bound to the browser is triggered.

Step S101: starting a page process to load a preset page, the page process notifying a first process of the browser to establish a data communication channel with the mobile terminal.

The preset page is a page loaded and displayed at the browser side after clicking the trigger button of the mobile phone assistant, and the preset page is a local page of the browser. After the trigger button of the mobile phone assistant is clicked, a request for starting the page process is initiated to the first process of the browser. The first process of the browser starts the page process according to the request, so that the page process loads the preset page. Specifically, when the page process loads the preset page, a notification of establishing a data communication channel between the first process of the browser and the mobile terminal is sent to the first process of the browser.

Step S102: after the data communication channel is established, notifying, by the page process, the first process of the browser to request the mobile terminal for the storage data information and/or the device information in the mobile terminal.

In this embodiment, the mobile terminal may connect a client-side where the browser is via WIFI or a USB data cable. After the data communication channel between the browser and the mobile terminal is established, the first process of the browser may detect whether the mobile terminal is connected. When the mobile terminal has been connected, the first process of the browser may notify the page process that the mobile terminal has been connected. After the page process receives the notification, transmitted by the first process of the browser, indicating that the mobile terminal has been connected, the first process of the browser may be notified to send, to the mobile terminal, a request for acquiring the storage data information and/or the device information in the mobile terminal. The first process of the browser transmits, to the mobile terminal by means of the ADB component, a command for requesting the storage data information and/or the device information in the mobile terminal.

Step S103: acquiring, by the page process, the storage data information and/or the device information in the mobile terminal transmitted by the first process of the browser, and loading and displaying the storage data information and/or the device information on the preset page.

The mobile terminal returns the storage data information and/or the device information in the mobile terminal to the first process of the browser using the ADB component. The first process of the browser returns, to the page process, the acquired storage data information and/or the device information in the mobile terminal. After acquiring the storage data information and/or the device information returned by the first process of the browser, the page process loads and displays the storage data information and/or the device information on the preset page.

According to the method provided by the above embodiment of the present invention, the data communication channel between the browser and the mobile terminal is established using a preset page so that direct data transmission is available between the browser and the mobile terminal without the help of other auxiliary application programs. The browser may acquire the storage data information and/or the device information in the mobile terminal, and load and display the storage data information and/or the device information on the preset page so that a user may view. Through the method, when the user wants to view the storage data information and/or the device information in the mobile terminal in the process of surfing the Internet to browse webpages, the user does not need to switch the program interface and can directly view the storage data information and/or the device information on the preset page via a trigger button provided by the browser, so that the operation is convenient.

In the present invention, the first process of the browser specifically may be the browser master process, wherein the page process communicates with the browser master process via a JS program written, in advance, in the preset page; and the browser master process communicates with the mobile terminal by invoking a DLL interface, which is preconfigured and is associated with an operating system of the mobile terminal, in the ADB component.

Alternatively, the first process of the browser specifically is a process which is independently arranged relative to the browser master process. The first process of the browser communicates with the page process via the browser master process by way of interprocess communication, wherein the interprocess communication refers to a technology or a method for transmitting data or signal information between at least two processes. The page process communicates with the browser master process via the JS program written, in advance, in the preset page. The first process of the browser communicates with the mobile terminal by invoking the DLL interface, which is preconfigured and is associated with the operating system of the mobile terminal, in the ADB component.

The following embodiments are introduced in detail by taking an example in which the first process of the browser is the browser master process.

Figure 2:
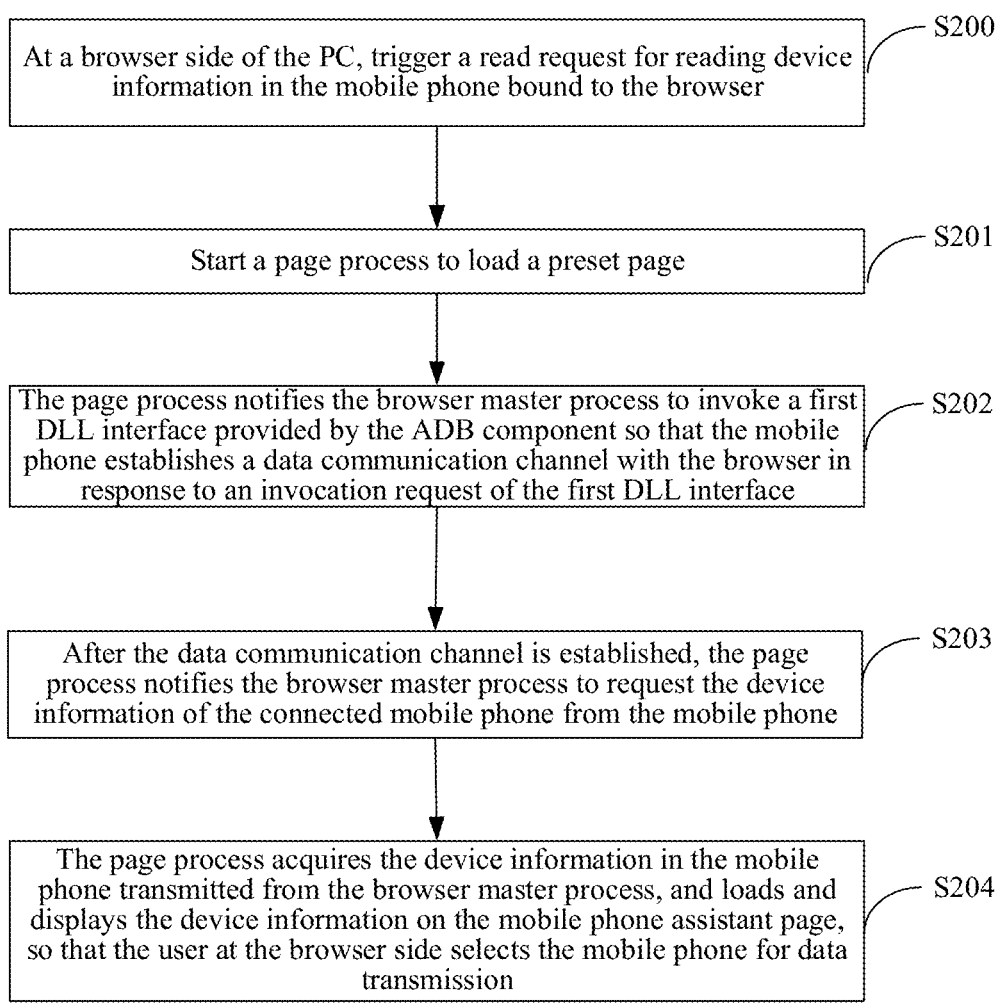
FIG. 2 is a flowchart of a method for performing communication between a browser and a mobile terminal according to another embodiment of the present invention.

FIG. 2 illustrates a flowchart of a method for performing communication between a browser and a mobile terminal according to another embodiment of the present invention. In this embodiment, an introduction is made by taking an example in which the mobile terminal is a mobile phone and the client is a PC. As shown in FIG. 2, the method includes following steps.

Step S200: at a browser side of the PC, triggering a read request for reading device information in the mobile phone bound to the browser.

The device information in the mobile phone includes status information of the mobile phone and desktop snapshot of the mobile phone. The status information of the mobile phone includes one or more of: a name and a model of the mobile phone, total storage amount information and remaining storage amount information of the mobile phone, and SD card information of the mobile phone.

Specifically, the browser interface comprises the trigger button of the mobile phone assistant, for example, adding the trigger button of the mobile phone assistant at a toolbar or a sidebar of the browser. After the user starts the browser in the PC, by clicking the trigger button of the mobile phone assistant, the read request for reading the device information in the mobile phone bound to the browser is triggered.

Step S201: starting a page process to load a preset page.

After the trigger button of the mobile phone assistant is clicked, a request for starting the page process is initiated to the browser master process. The browser master process starts the page process according to the request, so that the page process loads the preset page, namely a mobile phone assistant page.

The mobile phone assistant page is a page loaded and displayed at the browser side after the trigger button of the mobile phone assistant is clicked. The mobile phone assistant page is a local page of the browser instead of a page requested back from the network side. Script (JS) programs used for implementing various functions are written, in advance, in the mobile phone assistant page. These JS programs provide corresponding JS interfaces so as to be invoked by the page process. When the page process invokes a certain JS interface, the browser master process invokes the corresponding DLL interface provided by the ADB component to implement the corresponding function.

In the present invention, the JS interfaces supporting the invocation of the page process include but are not limited to:

AppStore_installApp(string app_name); installation application interface, the parameter is an application name AppStore_uninstallApp(string app_name); uninstallation application interface, the parameter is the application name AppStore_getMobileInfo( ); interface for acquiring the status information of the mobile phone AppStore_getAppList( ); interface for acquiring the application list information of the mobile phone AppStore_start( ); invocation interface when the page is started, used for establishing a data communication channel AppStore_isEnable( ); interface for querying whether to support enabling the functions of the mobile phone AppStore_getMobileScreenImage( ); interface for acquiring the desktop snapshot of the mobile phone AppStore_multiUpdateApp(string app_list_json); interface for batch update of the applications AppStore_cancelUpdateApp(string app_list_json); interface for canceling the batch update of the applications Except for the above JS interfaces which can be invoked by the page process, the mobile phone assistant page further provides JS interfaces which can be invoked by the browser master process for notifying a status, including but not limited to:

AppStore_onConnect(string connection_status); interface for notifying the page after the mobile phone is connected AppStore_setApkInstallStatus(string install_status_json); process status notification interface of an installed application AppStore_setApkUninstallStatus(string uninstall_status_json); process status notification interface of an uninstalled application AppStore_setAppList(string app_list_json); interface for returning an application list acquired on the mobile phone AppStore_setMobileInfo(string phone_info_json); interface for returning the status information of the mobile phone AppStore_setMobileScreenImage(string screen_snapshot_data); interface for returning screen snapshot of the mobile phone.

It is to be noted that the name of each of the JS interfaces is a self-defined name and should not be construed as limitation on the JS interfaces. Any JS interface used for implementing the above functions shall pertain to the scope of protection of the present invention.

Step S202: the page process notifying the browser master process to invoke a first DLL interface provided by the ADB component so that the mobile phone establishes a data communication channel with the browser in response to an invocation request of the first DLL interface.

When a mobile phone assistant page is started, the page process invokes an AppStore_start( ) interface. The browser master process invokes, according to the notification of the page process, the first DLL interface provided by the ADB component. By invoking the first DLL interface, a request for establishing a data communication channel with the mobile phone may be directly transmitted to the mobile phone. The ADB component is a client-server program. Therefore, the mobile phone may make response to the invocation request of the browser master process and establish a data communication channel with the browser, wherein the data communication channel allows the browser to carry out data transmission with the mobile phone.

Step S203: after the data communication channel is established, the page process notifying the browser master process to request the device information of the connected mobile phone from the mobile phone.

The device information of the mobile phone includes the status information of the mobile phone and the desktop snapshot of the mobile phone. The status information of the mobile phone comprises one or more of: a name and a model of the mobile phone, total storage amount information and remaining storage amount information of the mobile phone, and SD card information of the mobile phone.

A connected mobile phone refers to a mobile phone device having established a connection with the PC where the browser is via WIFI or a USB data cable.

Specifically, the page process notifies the browser master process to invoke a second DLL interface provided by the ADB component so that the mobile phone returns the status information of the mobile phone and the desktop snapshot of the mobile phone to the browser master process in response to an invocation request of the second DLL interface.

After the data communication channel between the browser and the mobile phone is established, the browser master process may detect whether the mobile phone is connected. When the mobile phone has been connected, the browser master process may invoke the AppStore_onConnect( ) interface and notify the page process that the mobile phone has been connected. After receiving a notification, sent by the browser master process, indicating that the mobile phone has been connected, the page process invokes the AppStore_getMobileInfo( ) interface and the AppStore_getMobileScreenImage( ) interface. According to the notification of the page process, the browser master process invokes a second DLL interface provided by the ADB component to request the mobile phone assistant for the status information of the mobile phone and the desktop snapshot of the mobile phone.

Step S204: acquiring, by the page process, the device information in the mobile phone transmitted from the browser master process, and loading and displaying the device information on the mobile phone assistant page, so that the user at the browser side selects the mobile phone for data transmission.

After acquiring the status information of the mobile phone and the desktop snapshot of the mobile phone, the browser master process provides the status information of the mobile phone and the desktop snapshot of the mobile phone for the page process; and the page process loads and displays the status information of the mobile phone and the desktop snapshot of the mobile phone in an information area of the preset page. When a plurality of mobile phones are connected to the browser, a manner of a drop-down menu may be adopted to respectively load and display the status information and the desktop snapshot of each mobile phone according to the user's selection. In addition, the user also needs to select one mobile phone for data transmission with the browser.

Specifically, according to the request sent by the browser master process, the mobile phone returns the status information of the mobile phone and the desktop snapshot of the mobile phone to the browser master process via the ADB component. After acquiring the status information of the mobile phone and the desktop snapshot of the mobile phone returned by the mobile phone, the browser master process invokes the AppStore_setMobileInfo(string phone_info_json) interface and the AppStore_setMobileScreenImage (string screen_snapshot_data) interface so as to provide the status information of the mobile phone and the desktop snapshot of the mobile phone for the page process.

Figure 3:
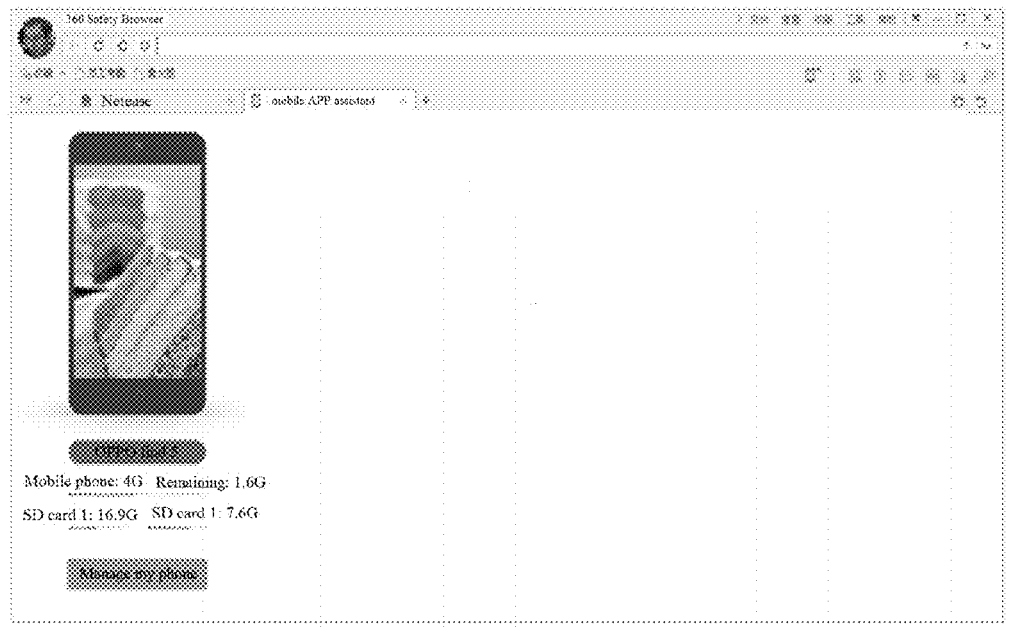
FIG. 3 is device information of a mobile terminal displayed in an information area of preset page.

Taking an OPPO mobile phone as an example, the page process displays, in the information area of the preset page, the name (OPPO Find5) of the mobile phone, the total storage amount information (4G) and the remaining storage amount information (1.6G) of the mobile phone, and the SD card information (total: 14.56 remaining: 7.2G) of the mobile phone which are acquired from the browser master process as well as the desktop of the current mobile phone, and displays "Manage my mobile phone" in the information area of the preset page, as shown in FIG. 3.

When the user does not connect the mobile phone, after the mobile phone assistant page has been loaded, the desktop snapshot of the mobile phone in the information area of the mobile phone assistant page is of a default robot pattern; a place for displaying the name of the mobile phone displays "the mobile phone not connected"; and a button at the bottom of the information area displays "To connect the mobile phone".

Figure 4:
FIG. 4 is updated device information of a mobile terminal displayed in a preset page.

Furthermore, the mobile phone assistant page in this embodiment may further display updated device information of the mobile phone. Specifically, when update occurs in the device information of the mobile phone, the mobile phone actively notifies the browser master process of the updated device information in the mobile phone via the ADB component. The browser master process provides the updated device information in the mobile phone for the page process, so that the page process reloads and displays the mobile phone assistant page according to the updated device information in the mobile phone. Taking the above OPPO mobile phone as an example, when the remaining storage amount of the mobile phone is changed from 1.6G to 0.7G and other device information does not change, the mobile phone notifies the browser master process of the updated device information of the mobile phone via the ADB component. The browser master process provides the updated device information in the mobile phone for the page process, so that the page process reloads and displays the mobile phone assistant page according to the updated device information in the mobile phone, wherein the information area of the mobile phone assistant page displays: OPPO Find5, the total storage amount information (4G) and the remaining storage amount information (0.7G) of the mobile phone, and the SD card information (total amount information: 14.5G and remaining information: 7.2G) of the mobile phone, as shown in FIG. 4.

According to the method provided by the above embodiment of the present invention, the data communication channel between the browser and the mobile terminal is established using a preset page so that direct data transmission is available between the browser and the mobile terminal. The browser may acquire the device information in the mobile terminal returned by the mobile terminal, and load and display the device information on the preset page so that a user may view. Through the method, when the user wants to view the device information in the mobile terminal in the process of surfing the Internet to browse webpages, the user does not need to switch the program interface and can directly view the device information on the preset page via a trigger button provided by the browser, so that the operation is convenient. By displaying the device information of the mobile terminal in the information area of the preset page and performing real-time update on the device information of the mobile terminal, the device information of the mobile terminal may be mastered conveniently in real time, thereby facilitating the user in operating the mobile terminal, and avoiding the defect of useless operation of the user due to insufficient storage amount of the mobile terminal.

Figure 5:
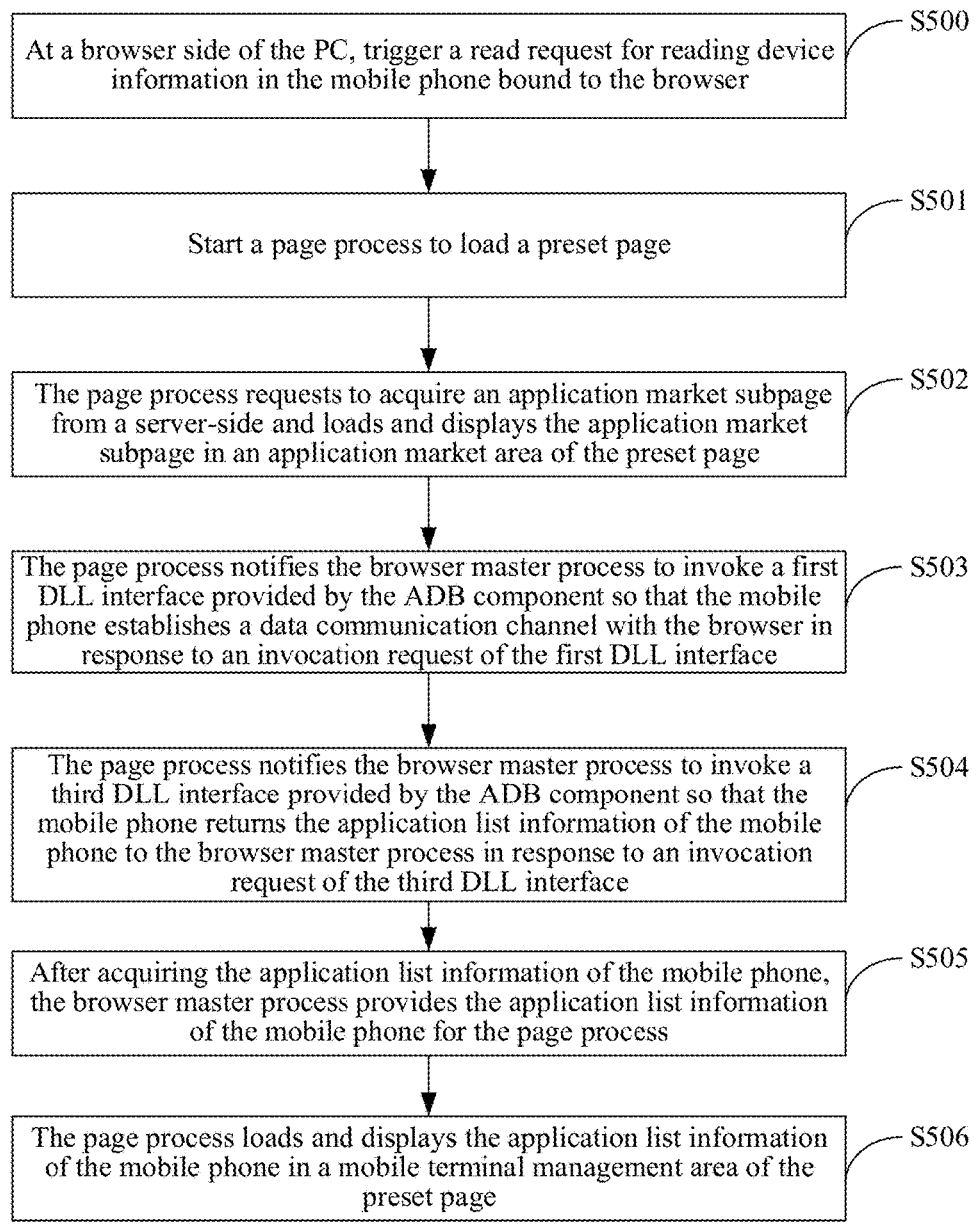
FIG. 5 is a flowchart of a method for performing communication between a browser and a mobile terminal according to another embodiment of the present invention.

FIG. 5 illustrates a flowchart of a method for performing communication between a browser and a mobile terminal according to another embodiment of the present invention. In this embodiment, introduction is made by taking an example in which the mobile terminal is a mobile phone and the client is a PC. As shown in FIG. 5, the method includes following steps.

Step S500: at a browser side of the PC, triggering a read request for reading device information in the mobile phone bound to the browser.

The storage data information in the mobile phone includes but is not limited to application list information of the mobile phone, wherein the application list information includes a plurality of data items, each of the data items carrying information of an installed application in the mobile phone. Each of the data items carrying information of an installed application in the mobile terminal further includes: name and version information and size and storage location information of the installed application.

Step S501: starting a page process to load a preset page.

This step is similar to Step S201 in the embodiment as shown in FIG. 2, and thus is not unnecessarily elaborated herein.

Step S502: the page process requesting to acquire an application market subpage from a server-side and loading and displaying the application market subpage in an application market area of the preset page.

Figure 6:
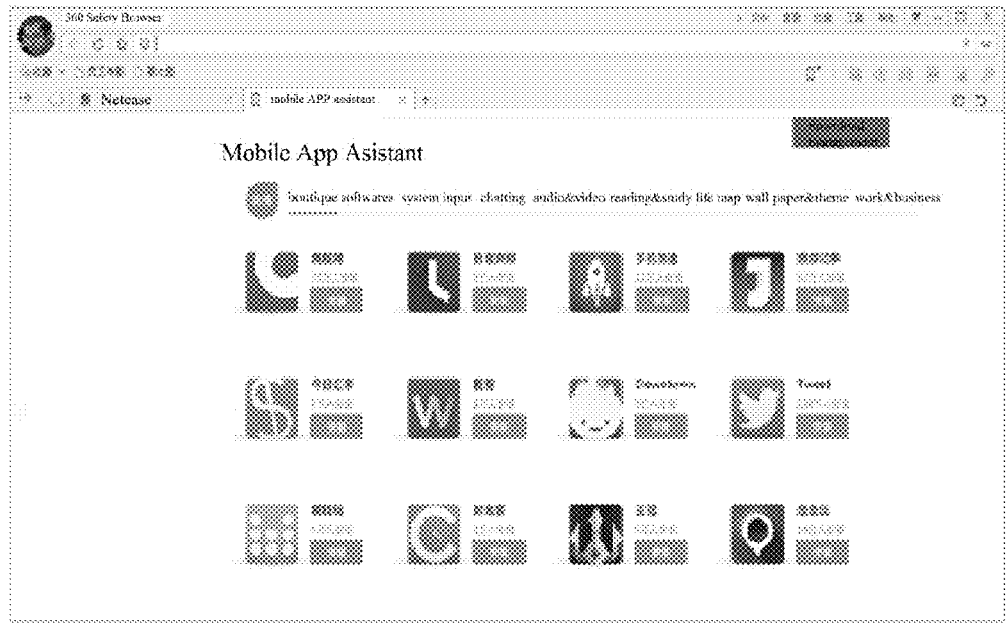
FIG. 6 is an application market subpage acquired from a server-side.

In the process of loading the preset page by the page process, the page process sends a request for acquiring an application market subpage to a server. The server returns the corresponding application market subpage to the page process according to the request sent by the page process; and the page process loads and displays the application market subpage returned by the server-side in an application market area of the preset page. For example, the application market area of the preset page may display applications with a high download frequency recently or display the applications acquired from the server-side according to categories of the applications, for example, displaying according to the categories such as system input, chat communication, audios and videos, reading and learning, living map, wallpaper theme, office business, and the like as shown in FIG. 6.

Step S503: the page process notifying the browser master process to invoke a first DLL interface provided by the ADB component so that the mobile phone establishes a data communication channel with the browser in response to an invocation request of the first DLL interface.

This step is similar to Step S202 in the embodiment as shown in FIG. 2, and thus is not unnecessarily elaborated herein.

The above Step S503 may be executed before Step S502 or may be synchronously executed with Step S502.

Step S504: the page process notifying the browser master process to invoke a third DLL interface provided by the ADB component so that the mobile phone returns the application list information of the mobile phone to the browser master process in response to an invocation request of the third DLL interface.

After the data communication channel between the browser and the mobile phone is established, the browser master process may detect whether the mobile phone is connected. When the mobile phone has been connected, the browser master process may notify the page process that the mobile terminal has been connected by invoking the AppStore_onConnect( ) interface. After receiving a notification, sent by the browser master process, indicating that the mobile phone has been connected, the page process invokes the AppStore_getAppList( ) interface, and the browser master process invokes a third DLL interface provided by the ADB component to request the mobile phone for the application list information of the mobile phone.

Step S505, after acquiring the application list information of the mobile phone, the browser master process providing the application list information of the mobile phone for the page process.

After receiving a request sent by the ADB component at the browser side for invoking the application list information of the mobile phone, the ADB component at a mobile phone side returns the application list information of the mobile phone to the browser master process via the ADB component. After acquiring the application list information of the mobile phone, the browser master process invokes the AppStore_setAppList(string app_list_json) interface, and provides the application list information of the mobile phone for the page process.

Step S506: the page process loading and displaying the application list information of the mobile phone in a mobile terminal management area of the preset page.

Figure 7:
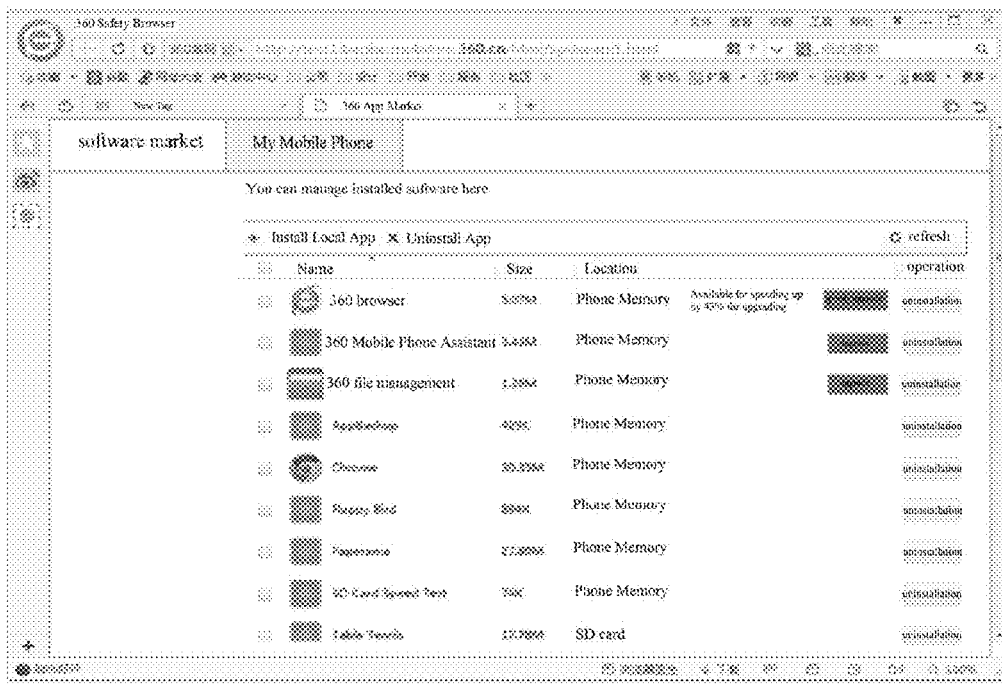
FIG. 7 is storage data information of mobile terminal displayed in an application market area of a preset page.

The name, size and storage location information of each installed application is displayed in the mobile terminal management area of the preset page, and an uninstallation option of each installed application is loaded and displayed. For an installed application determined to need upgrading according to the version information of the installed application, an upgrade option of the installed application is loaded and displayed. For example, when mobile phone applications acquired by the page process include 360 Browser, 360 Mobile Phone Assistant, 360 File Manager, AppBackup, Chrome, Flappy Bird, Paperama, SD Card Speed Test and Table Tennis, the mobile terminal management area of the preset page is as shown in FIG. 7. However, in the process of loading the application list information of the mobile phone, the mobile terminal management area of the preset page displays "Installed software of the mobile phone is being read, please wait".

Additionally, this embodiment further may be used for determining whether an installed application needs upgrading. Specifically, by comparing version information of the installed application with the version information of the same application in the application market subpage, when the version information of the installed application is identical to the version information of the same application in the application market subpage, the installed application does not need upgrading. However, when the version information of the installed application is not identical to the version information of the same application in the application market subpage, the installed application needs upgrading. At this moment, an "upgrade" option is displayed in the mobile terminal management area. When the user clicks the "upgrade" option, the upgrading is carried out on the application. The "upgrade" option includes speedy upgrading and upgrading. When the application may be upgraded by the way of the speedy upgrading, the page further displays a prompt of "Available for speeding up by xx % for upgrading".

Optionally, this embodiment further may carry out management on the applications in the mobile phone, for instance, upgrading or uninstalling the applications in the mobile phone, or installing, on the mobile phone, the applications displayed on the application market subpage. Specifically, the page process notifies the browser master process of an application ID of a specified application according to a triggered request of an installation/upgrade/uninstallation option of the specified application in the preset page, and the browser master process invokes a fourth DLL interface, corresponding to an operating command for installing/upgrading/uninstalling the specified application, provided by the ADB component so that the mobile terminal installs/upgrades/uninstalls the specified application in the mobile terminal in response to an invocation request of the fourth DLL interface.

The application ID herein may be an identity of the application, or may be the application name. Each application has a unique application ID, and the application needing to be operated may be recognized according to the application ID. After the user triggers the installation/upgrade/ uninstallation option of the specified application in the preset page, the page process invokes the AppStore_installApp(string app_name) installation interface and a corresponding upgrade interface (no specific definition thereof is given herein) or the AppStore_uninstallApp(string app_name) uninstallation interface, and respectively transmits app_name of the specified application to the installation interface, the upgrade interface and the uninstallation interface. According to a notification of the page process, the browser master process invokes the fourth DLL interface, provided by the ADB component, corresponding to an operating command for installing/upgrading/uninstalling the specified application, so that the mobile terminal installs/upgrades/uninstalls the specified application in the mobile terminal in response to an invocation request of the fourth DLL interface.

This embodiment not only may facilitate the user to operate the mobile phone, but also may display an operation result to the user after the user operates the mobile phone, and timely update a display content of the preset page. After installing/upgrading/uninstalling the specified application by the mobile terminal, the browser master program acquires a notification message indicating success or failure in installing/upgrading/uninstalling the specified application, and provides the notification message for the page process so that the page process updates a display content of the preset page according to the notification message indicating success or failure.

Specifically, the browser master process provides the notification message indicating success or failure in installing/upgrading/uninstalling the specified application by the mobile phone for the page process by invoking the AppStore_setApkInstallStatus(string install_status_json) (the process status notifying interface for installing an application), the process status notifying interface for upgrading an application and the AppStore_setApkUninstallStatus(string uninstall_status_json) (the process status notifying interface for uninstalling an application), so that the page process updates the display content of the preset page according to the notification message indicating success or failure.

In addition, the preset page in this embodiment further may display the updated storage data information of the mobile terminal. Specifically, when update occurs in the storage data information and/or the device information in the mobile terminal, the mobile terminal actively notifies the browser master process of the updated storage data information and/or the device information in the mobile terminal. The browser master process provides the updated storage data information and/or the device information in the mobile terminal for the page process, so that the page process reloads and displays the preset page according to the updated storage data information and/or the device information in the mobile terminal. In this way, the user may acquire the storage data information in the mobile terminal in real time, and the user is prevented from carrying out unnecessary operation, such as secondary installation.

This embodiment further may be used for detecting whether the mobile terminal has been disconnected. In the case of disconnection, the disconnection may be displayed to the user via the preset page. Specifically, after the mobile terminal disconnects from a client-side where the browser is, the browser master process receives a disconnection event message and provides the disconnection event message for the page process so that the page process reloads and displays the preset page according to the disconnection event message. Through the method, when a user network is unstable or the user unconsciously disconnects the mobile terminal, the user can be quickly and vividly informed of the disconnection. The user, after being informed of the disconnection, may select reconnection or stop subsequent operation, thereby avoiding some meaningless operation caused by failure of timely updating the display content on the preset page after the disconnection. After the mobile phone has been disconnected, the information area of the preset page may display the name of the mobile phone when the mobile phone is connected via a USB cable. However, the desktop snapshot of the mobile phone displays a robot snapshot when the mobile phone is not connected, and the bottom of the information area displays "Manage my mobile phone"; and the application market area displays "Your mobile phone is off-line, please connect your mobile phone to manage the mobile phone applications, and a 'Connect the mobile phone' option is provided in the application market area". When the mobile phone is connected via WIFI, the information area of the preset page may display the name of the mobile phone. However, the desktop snapshot of the mobile phone displays a default picture in a WIFI pattern, and the bottom of the information area displays "Manage my mobile phone"; and the application market area displays "Your authorization is required; for data security of your mobile phone, please click the button below and confirm the authorization on the mobile phone according to prompts; and a 'Read the mobile phone application list' option is provided in the application market area".

After the data communication channel is established, the browser not only may acquire data in the mobile terminal, but also may transmit abundant data provided by the network side to the mobile terminal. Specifically, the page process has the function of notifying the browser master process to send data to the mobile terminal, wherein the data comprise: URL information of a web page element in a browser loading page, or a downloaded file or a downloaded web page element. The data further comprise: an operating command and an operand for a specified APP in the mobile terminal. The data at the browser side are transmitted to the mobile terminal by using the established data communication channel, thus the defect that data transmission is unavailable between the browser and the mobile terminal and network contents needs to be copied or downloaded and then transferred to the mobile terminal is solved, so that the user may operate the mobile terminal directly via the browser, which facilitates the user, when surfing the Internet via the browser, in directly transferring the network contents acquired from the server to the mobile terminal.

Optionally, in this embodiment, not only the application at the browser side may be installed on the mobile terminal, but also a client-side program corresponding to an APP program in the mobile terminal may be installed at the client-side where the browser is according to the storage data information in the mobile terminal, thereby facilitating the user in installing and using the corresponding client-side program. Specifically, the page process automatically loads, at the browser side, corresponding browser plug-in information according to APP program information in the storage data information in the mobile terminal to install a client-side program corresponding to the APP program.

According to the method provided by the above embodiment of the present invention, the data communication channel between the browser and the mobile terminal is established using a preset page so that direct data transmission is available between the browser and the mobile terminal. The browser may acquire the storage data information in the mobile terminal, and load and display the storage data information on the preset page so that a user may view.

Through the method, when the user wants to view the storage data information in the mobile terminal in the process of surfing the Internet to browse webpages, the user does not need to switch the program interface and can directly view the storage data information on the preset page via a trigger button provided by the browser, so that the operation is convenient, the operation of the user is simplified, and the defect of a cumbersome setup operation of the mobile terminal when downloading data to the client side and connecting the USB data cables or using WIFI is solved.

In the embodiments as shown in FIG. 2 and FIG. 5 of the present invention, the page process communicates with the browser master process by means of a JS program written, in advance in the preset page, and the browser master process communicates with the mobile terminal using a preconfigured ADB component.

As another implementation, the browser side is provided with a first process (namely, the process implementing the ADB client-side program) that may directly carry out data communications with a mobile phone. The first process is a process which is independently arranged relative to the browser master process. The first process communicates with the browser master process by way of interprocess communication, and the browser master process communicates with the page process via a JS program written, in advance, in the preset page. That is, the page process carries out data communications with the mobile phone by means of the browser master process and the first process in sequence.

Figure 8:
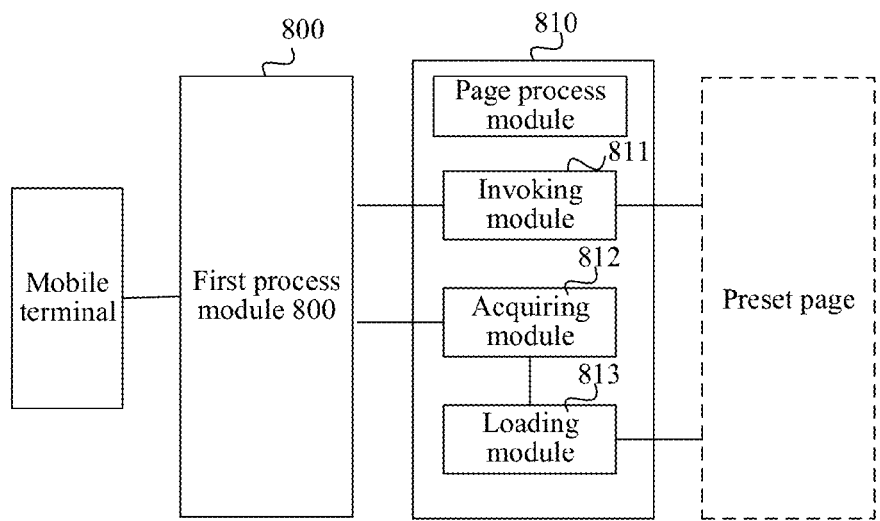
FIG. 8 is a schematic structural diagram of a browser apparatus according to an embodiment of the present invention.

FIG. 8 illustrates a structural block diagram of a browser apparatus according to an embodiment of the present invention. The browser side is preconfigured and installed with an ADB component associated with an operating system of the mobile terminal, and the ADB component provides a plurality of DLL interfaces that can be invoked by the first process module for implementing a designated function. As shown in FIG. 8, the browser apparatus includes: a first process module 800 configured to run a first process of the browser and a first page process module 810 configured to run a page process, wherein the first page process module 810 includes: a first invoking module 811, a first acquiring module 812 and a first loading module 813.

The first process module 800 is configured to: trigger, at a browser side, a read request for reading storage data information and/or device information in a mobile terminal bound to the browser; start a page process to load a preset page, and establish a data communication channel with the mobile terminal according to a notification of the page process module.

The storage data information in the mobile terminal includes application list information of the mobile terminal, wherein the application list information includes a plurality of data items, each of the data items carrying information of an installed application in the mobile phone. Each of the data items carrying information of an installed application in the mobile terminal further includes: name and version information and size and storage location information of the installed application. The device information of the mobile terminal includes status information of the mobile terminal and desktop snapshot of the mobile terminal. The status information of the mobile terminal includes one or more of: a name and a model of the mobile terminal, total storage amount information and remaining storage amount information of the mobile terminal, and SD card information of the mobile terminal.

The first invoking module 811 is configured to notify the first process module to request the mobile terminal for the storage data information and/or the device information in the mobile terminal.

The first acquiring module 812 is configured to acquire the storage data information and/or the device information in the mobile terminal transmitted by the first process module.

The first loading module 813 is configured to load and display the storage data information and/or the device information in the mobile terminal on the preset page.

Optionally, the first process module 800 further is configured to invoke a first DLL interface provided by the ADB component according to a notification of the page process module so that the mobile terminal establishes a data communication channel with the browser in response to an invocation request of the first DLL interface.

The first process module 800 further is configured to request the mobile terminal for the device information of the connected mobile terminal according to the notification of the page process module.

The first loading module 813 is further configured to display the device information of the connected mobile terminal on the preset page so that a user at the browser side selects the mobile terminal for data transmission.

The first process module 800 further is configured to invoke a second DLL interface provided by the ADB component according to the notification of the page process module so that the mobile terminal returns the status information of the mobile terminal and the desktop snapshot of the mobile terminal to the first process module in response to an invocation request of the second DLL interface; and provide, after acquiring the status information of the mobile terminal and the desktop snapshot of the mobile terminal, the status information of the mobile terminal and the desktop snapshot of the mobile terminal for the acquiring module.

The first loading module 813 is further configured to load and display the status information of the mobile terminal and the desktop snapshot of the mobile terminal in an information area of the preset page.

According to the browser apparatus provided by the above embodiment of the present invention, the data communication channel between the browser and the mobile terminal is established using a preset page so that direct data transmission is available between the browser and the mobile terminal. The browser may acquire the device information in the mobile terminal returned by the mobile terminal, and load and display the device information on the preset page so that a user may view. Using the browser apparatus, when the user wants to view the device information in the mobile terminal in the process of surfing the Internet to browse webpages, the user does not need to switch the program interface and can directly view the device information on the preset page via a trigger button provided by the browser, so that the operation is convenient. By displaying the device information of the mobile terminal in the information area of the preset page and performing real-time update on the device information of the mobile terminal, the device information of the mobile terminal may be mastered conveniently in real time, thereby facilitating the user in operating the mobile terminal, and avoiding the defect of useless operation of the user due to insufficient storage amount of the mobile terminal.

Figure 9:
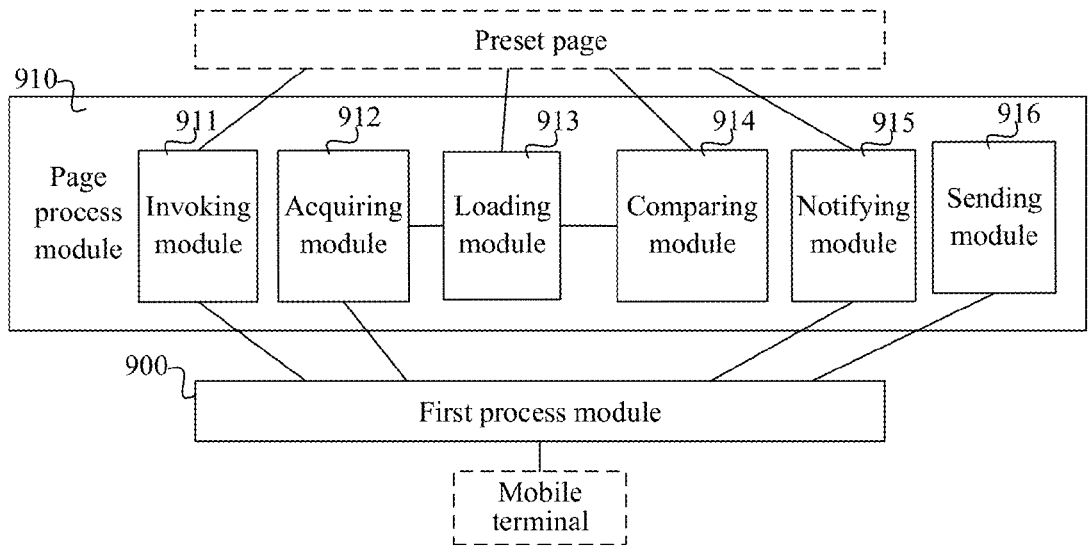
FIG. 9 is a schematic structural diagram of a browser apparatus according to another embodiment of the present invention.

FIG. 9 illustrates a structural block diagram of a browser apparatus according to another embodiment of the present invention. As shown in FIG. 9, the browser apparatus includes: a first process module 900 configured to run a first process of the browser and a first page process module 910 configured to run a page process, wherein the first page process module 910 includes: a first invoking module 911, a first acquiring module 912, a first loading module 913, a first comparing module 914, a first notifying module 915 and a first sending module 916.

The first process module 900 is configured to: trigger, at a browser side, a read request for reading storage data information and/or device information in a mobile terminal bound to the browser; start a page process to load a preset page, and establish a data communication channel with the mobile terminal according to a notification of the page process module.

A first invoking module 911 is configured to notify the first process module 900 to request the mobile terminal for the storage data information in the mobile terminal.

The first acquiring module 912 is configured to acquire the storage data information in the mobile terminal transmitted by the first process module 900.

The first loading module 913 is configured to load and display the storage data information in the mobile terminal on the preset page.

Optionally, the first process module 900 further is configured to invoke a first DLL interface provided by the ADB component according to a notification of the page process module 910 so that the mobile terminal establishes a data communication channel with the browser in response to an invocation request of the first DLL interface.

The first process module 900 further is configured to: invoke a third DLL interface provided by the ADB component according to the notification of the page process module 910 so that the mobile terminal returns the application list information of the mobile terminal to the first process module in response to an invocation request of the third DLL interface; and provide, after acquiring the application list information of the mobile terminal, the application list information of the mobile terminal for the acquiring module.

The first loading module 913 further is configured to load and display the application list information of the mobile terminal in a mobile terminal management area of the preset page.

The first loading module 913 is further configured to: display name, size and storage location information of each installed application in the mobile terminal management area of the preset page, and load and display an uninstallation option of each installed application; and load and display, for an installed application determined to need upgrading according to the version information of the installed application, an upgrade option of the installed application.

The first loading module 913 is further configured to: load the preset page, and display an application market subpage requested from a server-side in an application market area of the preset page.

The first page process module 910 further comprises: a first comparing module 914, configured to compare the version information of the installed application with version information of the same application in the application market subpage to determine whether the installed application needs upgrading.

The first page process module 910 further comprises: a first notifying module 915, configured to notify an application ID of a specified application to the first process module 900 according to a triggered request of an installation/upgrade/uninstallation option of the specified application in the preset page.

The first process module 900 is further configured to invoke a fourth DLL interface, corresponding to an operating command for installing/upgrading/uninstalling the specified application, provided by the ADB component so that the mobile terminal installs/upgrades/uninstalls the specified application in the mobile terminal in response to an invocation request of the fourth DLL interface.

The first process module 900 is further configured to acquire a notification message indicating success or failure in installing/upgrading/uninstalling the specified application by the mobile terminal, and provide the notification message indicating success or failure in installing/upgrading/uninstalling the specified application by the mobile terminal for the acquiring module 912.

The first loading module 913 is further configured to update a display content of the preset page according to the notification message indicating success or failure.

The first process module 900 is further configured to: receive the updated storage data information and/or the device information in the mobile terminal actively notified when update occurs in the storage data information and/or the device information in the mobile terminal; and provide the updated storage data information and/or the device information in the mobile terminal for the acquiring module.

The first loading module 913 is further configured to reload and display the preset page according to the updated storage data information and/or the device information in the mobile terminal.

The first process module 900 is further configured to: receive a disconnection event message sent after the mobile terminal disconnects from a client-side where the browser is; and provide the disconnection event message for the acquiring module.

The first loading module 913 is further configured to reload and display the preset page according to the disconnection event message.

The first page process module 910 further comprises: a first sending module 916, configured to notify the first process module to send data to the mobile terminal, wherein the data comprise: URL information of a web page element in a browser loading page, or a downloaded file or a downloaded web page element. The data further comprise: an operating command and an operand for a specified APP in the mobile terminal.

The first process module 900 is further configured to automatically load, at the browser side, corresponding browser plug-in information according to APP program information in the storage data information in the mobile terminal to install a client-side program corresponding to the APP program.

According to the browser apparatus provided by the above embodiment of the present invention, the data communication channel between the browser and the mobile terminal is established using a preset page so that direct data transmission is available between the browser and the mobile terminal. The browser may acquire the storage data information in the mobile terminal, and load and display the storage data information on the preset page so that a user may view. By using the browse apparatus, when the user wants to view the storage data information in the mobile terminal in the process of surfing the Internet to browse webpages, the user does not need to switch the program interface and can directly view the storage data information on the preset page via a trigger button provided by the browser, so that the operation is convenient, the operation of the user is simplified, and the defect of a cumbersome setup operation of the mobile terminal when downloading data to the client side and connecting the USB data cables or using WIFI is solved.

In the embodiments as shown in FIG. 8 and FIG. 9 of the present invention, the first process module specifically may be a master process module, the first page process module communicates with the master process module by means of a JS program written, in advance in the preset page, and the master process module communicates with the mobile terminal using a preconfigured ADB component.

As another implementation, the first process module comprises a master process module and a first process submodule independently arranged relative to the master process module, and the first process submodule carries out communications with the page process module via the master process module by way of interprocess communication. In this implementation, the browser apparatus is provided with a first process submodule (namely, the process submodule implementing the ADB client-side program) that may directly carry out data communications with a mobile phone. The first process submodule is a subprocess module which is independently arranged relative to the master process module. The first process submodule communicates with the master process module by way of interprocess communication, and the master process module communicates with the page process module via a JS program written, in advance, in the preset page. That is, the page process module carries out data communications with the mobile phone by means of the master process module and the first process submodule in sequence.

Further, in the present invention, the data communication between the browser and the mobile terminal may be implemented by virtue of an auxiliary application program such as a mobile phone assistant, and the browser carries out data communication with the mobile terminal by means of the auxiliary application program. The first transmission tool program in the following embodiment is the auxiliary application program. In the present invention, the mobile phone assistant will be taken as an example for detailed introduction. However, the first transmission tool program is not limited to the mobile phone assistant. Those skilled in the art may adopt other auxiliary application programs according to needs of practical application, which is not specifically limited.

Figure 10:
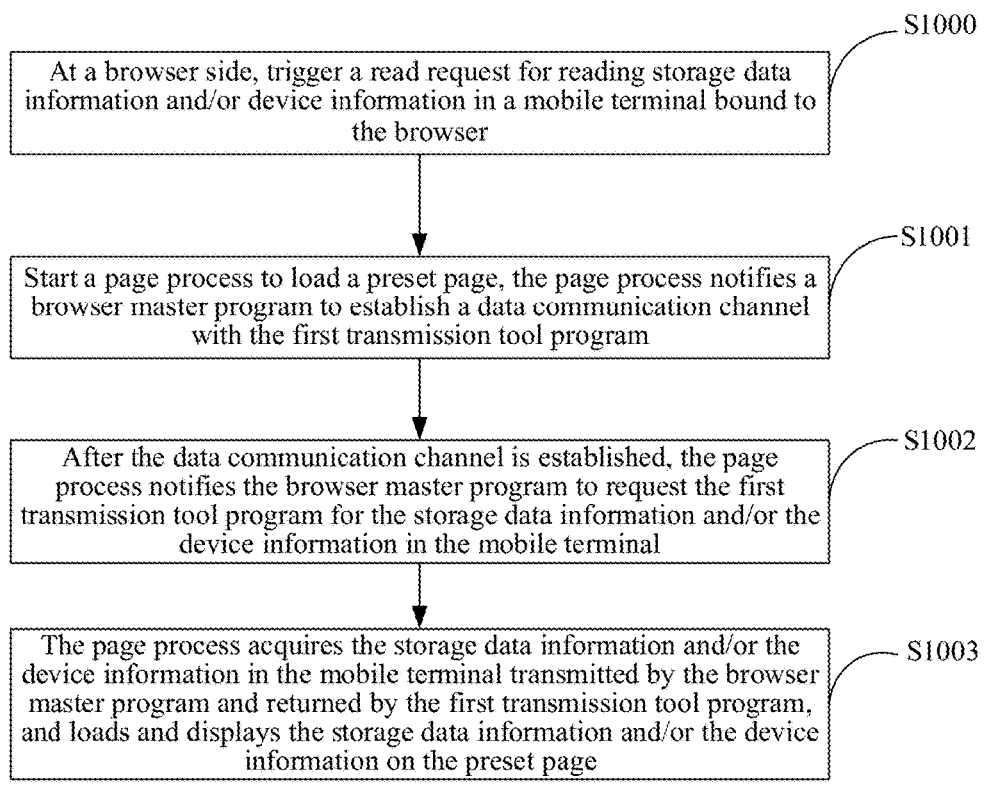
FIG. 10 is a flowchart of a method for performing communication between a browser and a mobile terminal according to still another embodiment of the present invention.

FIG. 10 illustrates a flowchart of a method for performing communication between a browser and a mobile terminal according to still another embodiment of the present invention. As shown in FIG. 1, the method includes following steps.

Step S1000: at a browser side, triggering a read request for reading storage data information and/or device information in a mobile terminal bound to the browser.

Specifically, a browser interface comprises a trigger button of a first transmission tool program. After the user starts the browser via the client side, by clicking the trigger button of the first transmission tool program, the read request for reading storage data information and/or device information in the mobile terminal bound to the browser is triggered.

Step S1001: starting a page process to load a preset page, the page process notifying a browser master program to establish a data communication channel with the first transmission tool program.

The preset page is a page loaded and displayed at the browser side after clicking the trigger button of the first transmission tool program, and the preset page is a local page of the browser. After the trigger button of the first transmission tool program is clicked, a request for starting the page process is initiated to the browser master process. The browser master process starts the page process according to the request, so that the page process loads the preset page. Specifically, when the page process loads the preset page, a notification of establishing a data communication channel between the browser master program and the first transmission tool program is sent to the browser master program.

Step S1002: after the data communication channel is established, notifying, by the page process, the browser master program to request the first transmission tool program for the storage data information and/or the device information in the mobile terminal.

In this embodiment, the mobile terminal may connect a client-side where the browser is via WIFI or a USB data cable. After the data communication channel between the browser and the first transmission tool program is established, the browser master program may detect whether the mobile terminal is connected. When the mobile terminal has been connected, the browser master process may notify the page process that the mobile terminal has been connected. After the page process receives the notification, transmitted by the browser master program, indicating that the mobile terminal has been connected, the browser master program may be notified to send, to the first transmission tool program, a request for acquiring the storage data information and/or the device information in the mobile terminal.

Step S1003: acquiring, by the page process, the storage data information and/or the device information in the mobile terminal transmitted by the browser master program and returned by the first transmission tool program, and loading and displaying the storage data information and/or the device information on the preset page.

The first transmission tool program acquires, from the mobile terminal, the application list information of the mobile terminal, the status information of the mobile terminal and the desktop snapshot of the mobile terminal according to a request sent by the browser master program. The first transmission tool program returns the application list information of the mobile terminal, the status information of the mobile terminal and the desktop snapshot of the mobile terminal acquired from the mobile terminal to the browser master program, and then the browser master program returns the same acquired from the first transmission tool program to the page process. After acquiring the storage data information and/or the device information returned by the browser master program, the page process loads and displays the storage data information and/or the device information on the preset page.

According to the method provided by the above embodiment of the present invention, the data communication channel between the browser and the first transmission tool program is established using a preset page so that direct data transmission is available between the browser and the mobile terminal. The browser may acquire the storage data information and/or the device information in the mobile terminal returned by the first transmission tool program, and load and display the storage data information and/or the device information on the preset page so that a user may view. Through the method, when the user wants to view the storage data information and/or the device information in the mobile terminal in the process of surfing the Internet to browse webpages, the user does not need to switch the program interface and can directly view the storage data information and/or the device information on the preset page via a trigger button provided by the browser, so that the operation is convenient.

Figure 11:
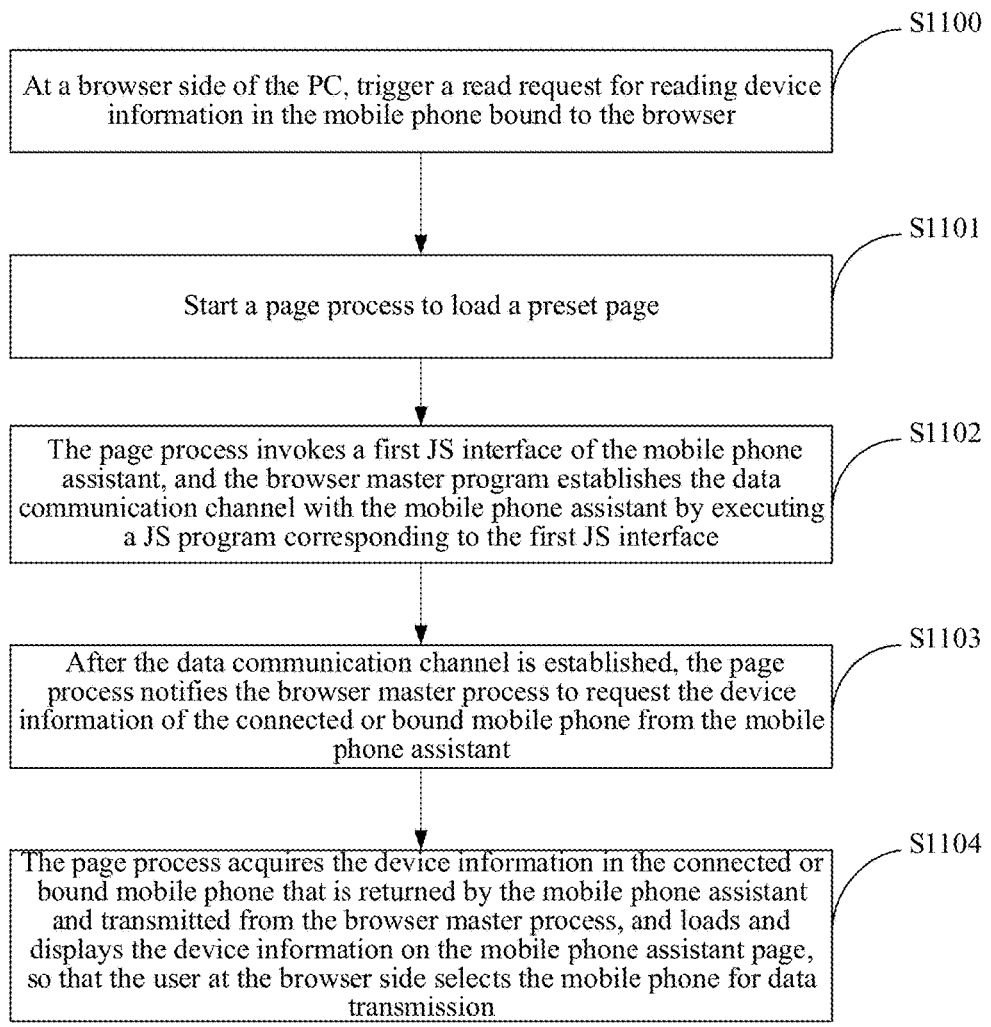
FIG. 11 is a flowchart of a method for performing communication between a browser and a mobile terminal according to still another embodiment of the present invention.

FIG. 11 illustrates a flowchart of a method for performing communication between a browser and a mobile terminal according to still another embodiment of the present invention. In this embodiment, an introduction is made by taking an example in which the mobile terminal is a mobile phone, the client is a PC and the first transmission tool program is a mobile phone assistant. As shown in FIG. 11, the method includes following steps.

Step S1100: at a browser side of the PC, triggering a read request for reading device information in the mobile phone bound to the browser.

The device information in the mobile phone includes status information of the mobile phone and desktop snapshot of the mobile phone. The status information of the mobile phone includes one or more of: a name and a model of the mobile phone, total storage amount information and remaining storage amount information of the mobile phone, and SD card information of the mobile phone.

Specifically, the browser interface comprises the trigger button of the first transmission tool program, for example, adding the trigger button of the mobile phone assistant at a toolbar or a sidebar of the browser. After the user starts the browser in the PC, by clicking the trigger button of the mobile phone assistant, the read request for reading the device information in the mobile phone bound to the browser is triggered.

Step S1101: starting a page process to load a preset page.

After the trigger button of the mobile phone assistant is clicked, a request for starting the page process is initiated to the browser master process. The browser master process starts the page process according to the request, so that the page process loads the preset page, namely the mobile phone assistant page.

The mobile phone assistant page is a page loaded and displayed at the browser side after the trigger button of the mobile phone assistant is clicked. The mobile phone assistant page is a local page of the browser instead of a page requested back from the network side. Script (JS) programs used for implementing various functions are written, in advance, in the mobile phone assistant page. These JS programs provide corresponding JS interfaces so as to be invoked by the page process. When the page process invokes a certain JS interface, the browser master process may execute a JS program corresponding to the JS interface to implement the function provided by the JS program.

In the present invention, the JS interfaces supporting the invocation of the page process include but are not limited to:

AppStore_installApp(string app_name); installation application interface, the parameter is an application name AppStore_uninstallApp(string app_name); uninstallation application interface, the parameter is the application name AppStore_getMobileInfo( ); interface for acquiring the status information of the mobile phone AppStore_getAppList( ); interface for acquiring the application list information of the mobile phone AppStore_start( ); invocation interface when the page is started, used for establishing a data communication channel AppStore_isEnable( ); interface for querying whether to support enabling the functions of the mobile phone AppStore_getMobileScreenImage( ); interface for acquiring the desktop snapshot of the mobile phone AppStore_multiUpdateApp(string app_list_json); interface for batch update of the applications AppStore_cancelUpdateApp(string app_list_json); interface for canceling the batch update of the applications Except for the above JS interfaces which can be invoked by the page process, the mobile phone assistant page further provides JS interfaces which can be invoked by the browser master process for notifying a status, including but not limited to:

AppStore_onConnect(string connection_status); interface for notifying the page after the mobile phone is connected AppStore_setApkInstallStatus(string install_status_json); process status notification interface of an installed application AppStore_setApkUninstallStatus(string uninstall_status_json); process status notification interface of an uninstalled application AppStore_setAppList(string app_list_json); interface for returning an application list acquired on the mobile phone AppStore_setMobileInfo(string phone_info_json); interface for returning the status information of the mobile phone AppStore_setMobileScreenImage(string screen_snapshot_data); interface for returning screen snapshot of the mobile phone.

It is to be noted that the name of each of the JS interfaces is a self-defined name and should not be construed as limitation on the JS interfaces. Any JS interface used for implementing the above functions shall pertain to the scope of protection of the present invention.

Step S1102: the page process invoking a first JS interface of the mobile phone assistant, and the browser master program establishing the data communication channel with the mobile phone assistant by executing a JS program corresponding to the first JS interface.

When the mobile phone assistant is started, the page process invokes the AppStore_start( ) interface (namely, the first JS interface of the mobile phone assistant page), and the browser master program establishes the data communication channel with the mobile phone assistant by executing a JS program corresponding to the AppStore_start( ) interface, wherein the data communication channel allows the browser to carry out data transmission with the mobile phone assistant.

Step S1103: after the data communication channel is established, the page process notifying the browser master process to request the device information of the connected or bound mobile phone from the mobile phone assistant.

The connected or bound mobile phone refers to a mobile phone device having established a connection with the PC where the browser is via WIFI or a USB data cable or a mobile phone device previously connected and set a binding relationship with the PC where the browser is.

Specifically, the page process invokes a second JS interface of the mobile phone assistant, and the browser master program requests the status information of the mobile phone and the desktop snapshot of the mobile phone from the mobile phone assistant by executing the JS program corresponding to the second JS interface.

After the data communication channel between the browser and the mobile phone assistant is established, the browser master process may detect whether the mobile phone is connected. When the mobile phone has been connected, the browser master process may invoke the AppStore_onConnect( ) interface and notify the page process that the mobile phone has been connected. After receiving the notification, sent by the browser master process, indicating that the mobile phone has been connected, the page process invokes the AppStore_getMobileInfo( ) interface and the AppStore_getMobileScreenImage( ) interface. The browser master process requests the status information of the mobile phone and the desktop snapshot of the mobile phone from the mobile phone assistant by executing the JS programs corresponding to the AppStore_getMobileInfo( ) interface and the AppStore_getMobileScreenImage( ) interface.

The browser master program may also notify the page process when the browser master program detects that the mobile phone with a set binding relationship. The page process requests the status information of the bound mobile phone from the mobile phone assistant by invoking the corresponding JS interface.

Step S1104: acquiring, by the page process, the device information in the connected or bound mobile phone that is returned by the mobile phone assistant and transmitted from the browser master process, and loading and displaying the device information on the mobile phone assistant page, so that the user at the browser side selects the mobile phone for data transmission.

After acquiring the status information and the desktop snapshot of one or more mobile phones returned by the mobile phone assistant, the browser master process invokes the third JS interface and provides the status information and the desktop snapshot of one or more mobile phones for the page process. The page process loads and displays the status information and the desktop snapshot of one or more mobile phones in an information area of the preset page. When a plurality of mobile phones are connected or bound to the browser, a manner of a drop-down menu may be adopted to respectively load and display the status information and the desktop snapshot of each mobile phone according to the user's selection. In addition, the user also needs to select one mobile phone for data transmission with the browser.

Specifically, according to the request sent by the browser master process, the mobile phone assistant requests to acquire the status information of the mobile phone and the desktop snapshot of the mobile phone from the mobile phone, and returns the acquired status information of the mobile phone and the desktop snapshot of the mobile phone to the browser master process. After acquiring the status information of the mobile phone and the desktop snapshot of the mobile phone returned by the mobile phone assistant, the browser master process invokes the AppStore_setMobileInfo(string phone_info_json) interface and the AppStore_setMobileScreenImage(string screen_snapshot_data) interface so as to provide the status information of the mobile phone and the desktop snapshot of the mobile phone for the page process. The page process loads and displays the storage data information and/or the device information in the information area of the preset page.

Figure 12:
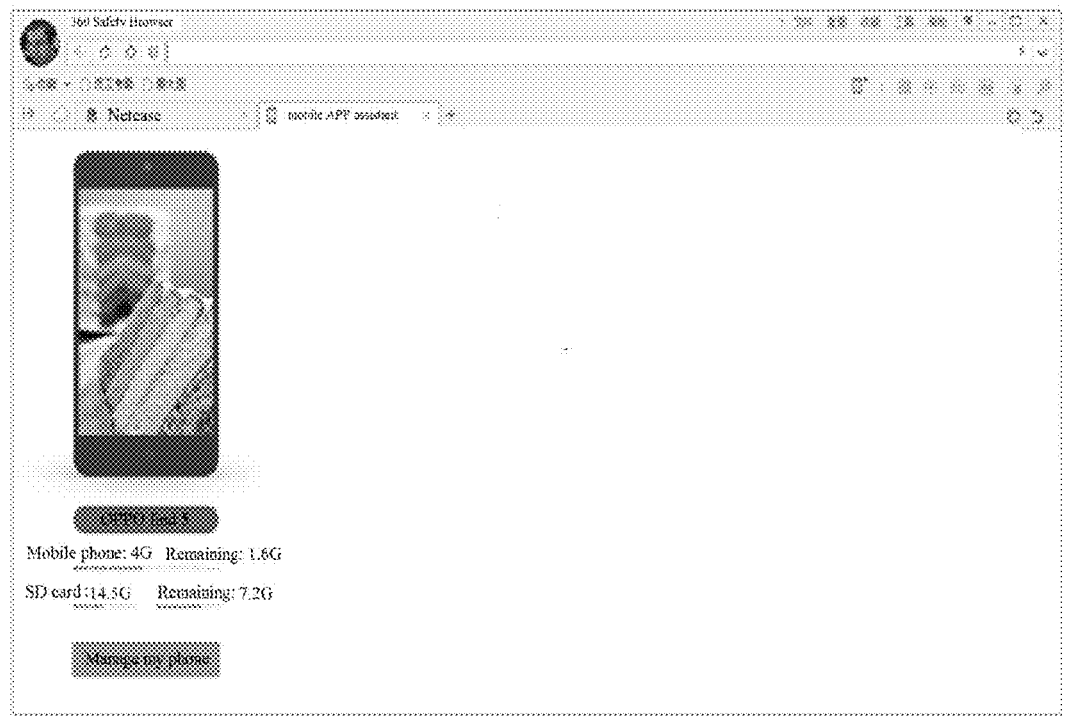
FIG. 12 is device information of another mobile terminal displayed in an information area of a preset page.

Taking an OPPO mobile phone as an example, the page process displays, in the information area of the preset page, the name (OPPO Find5) of the mobile phone, the total storage amount information (4G) and the remaining storage amount information (1.6G) of the mobile phone, and the SD card information (total: 14.56 remaining: 7.2G) of the mobile phone which are acquired from the browser master process as well as the desktop of the current mobile phone, and displays "Manage my mobile phone" in the information area of the preset page, as shown in FIG. 12.

When the user does not connect the mobile phone, after the mobile phone assistant page has been loaded, the desktop snapshot of the mobile phone in the information area of the mobile phone assistant page is of a default robot pattern; a place for displaying the name of the mobile phone displays "the mobile phone not connected"; and a button at the bottom of the information area displays "To connect the mobile phone".

Figure 13:
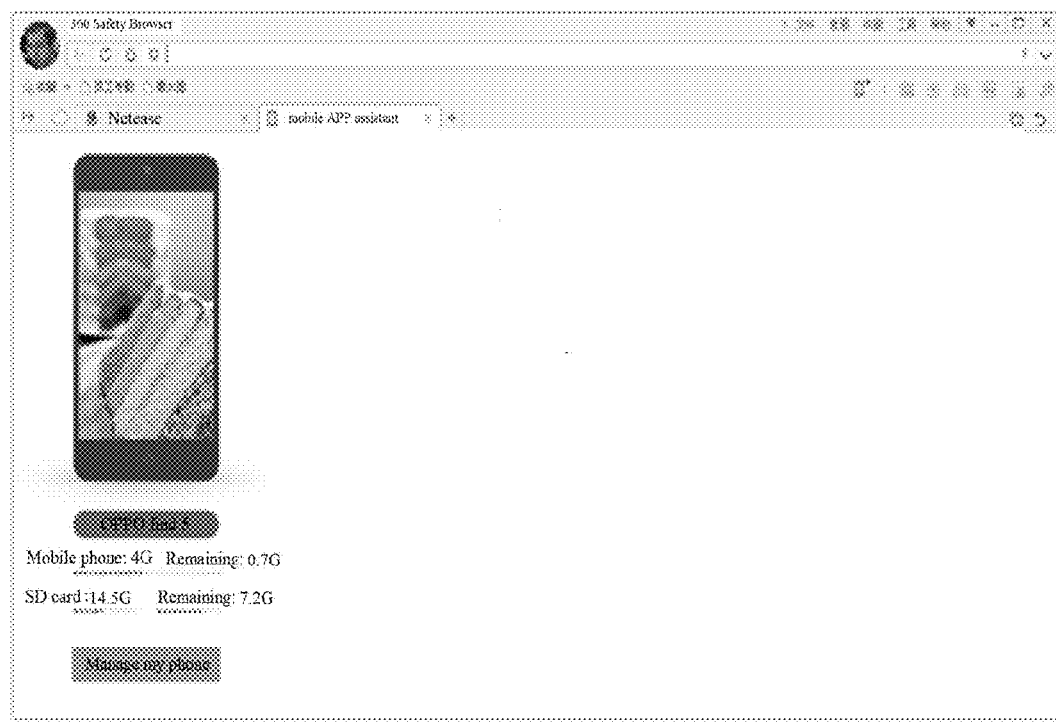
FIG. 13 is updated device information of another mobile terminal displayed in an information area of a preset page.

Furthermore, the mobile phone assistant page in this embodiment may further display updated device information of the mobile phone. Specifically, when update occurs in the device information of the mobile phone, the mobile phone assistant actively notifies the browser master process of the updated device information in the mobile phone. The browser master process provides the updated device information in the mobile phone for the page process, so that the page process reloads and displays the mobile phone assistant page according to the updated device information in the mobile phone. Taking the above OPPO mobile phone as an example, when the remaining storage amount of the mobile phone is changed from 1.6G to 0.7G and other device information does not change, the mobile phone assistant notifies the browser master process of the updated device information of the mobile phone. The browser master process provides the updated device information in the mobile phone for the page process, so that the page process reloads and displays the mobile phone assistant page according to the updated device information in the mobile phone, wherein the information area of the mobile phone assistant page displays: OPPO Find5, the total storage amount information (4G) and the remaining storage amount information (0.7G) of the mobile phone, and the SD card information (total amount information: 14.5G and remaining information: 7.2G) of the mobile phone, as shown in FIG. 13.

According to the method provided by the above embodiment of the present invention, the data communication channel between the browser and the first transmission tool program is established using a preset page so that direct data transmission is available between the browser and the mobile terminal. The browser may acquire the device information in the mobile terminal returned by the first transmission tool program, and load and display the device information on the preset page so that a user may view. Through the method, when the user wants to view the device information in the mobile terminal in the process of surfing the Internet to browse webpages, the user does not need to switch the program interface and can directly view the device information on the preset page via a trigger button provided by the browser, so that the operation is convenient. By displaying the device information of the mobile terminal in the information area of the preset page and performing real-time update on the device information of the mobile terminal, the device information of the mobile terminal may be mastered conveniently in real time, thereby facilitating the user in operating the mobile terminal, and avoiding the defect of useless operation of the user due to insufficient storage amount of the mobile terminal.

Figure 14:
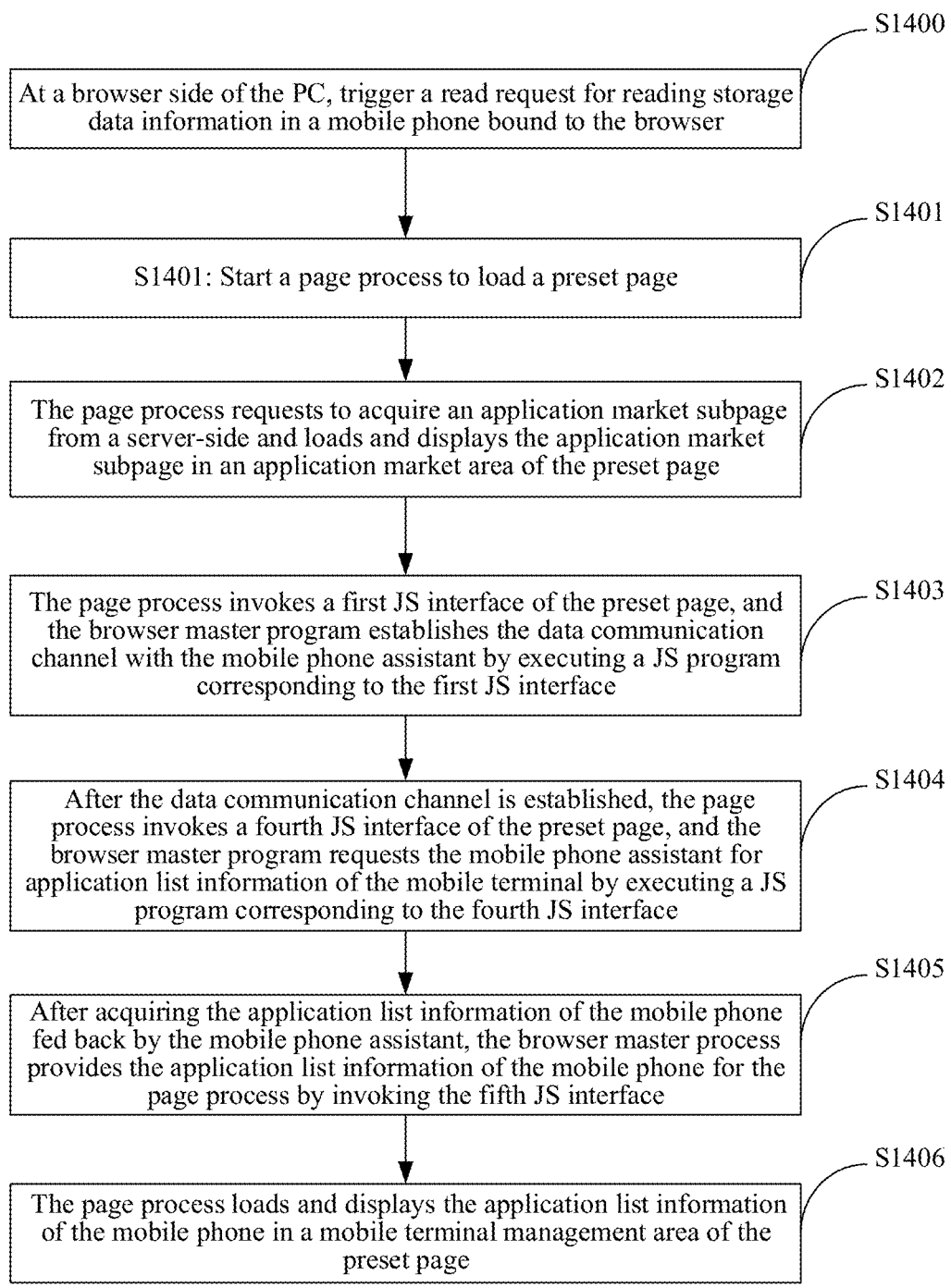
FIG. 14 is a flowchart of a method for performing communication between a browser and a mobile terminal according to still another embodiment of the present invention.

FIG. 14 illustrates a flowchart of a method for performing communication between a browser and a mobile terminal according to still another embodiment of the present invention. In this embodiment, an introduction is made by taking an example in which the mobile terminal is a mobile phone, the client is a PC and the first transmission tool program is a mobile phone assistant. As shown in FIG. 14, the method includes following steps.

Step S1400: at a browser side of the PC, triggering a read request for reading storage data information in a mobile phone bound to the browser.

The storage data information in the mobile phone includes but is not limited to application list information of the mobile phone, wherein the application list information includes a plurality of data items, each of the data items carrying information of an installed application in the mobile phone. Each of the data items carrying information of an installed application in the mobile terminal further includes: name and version information and size and storage location information of the installed application.

Step S1401: starting a page process to load a preset page.

This step is similar to Step S1101 in the embodiment as shown in FIG. 11, and thus is not unnecessarily elaborated herein.

Step S1402: the page process requesting to acquire an application market subpage from a server-side and loading and displaying the application market subpage in an application market area of the preset page.

Figure 15:
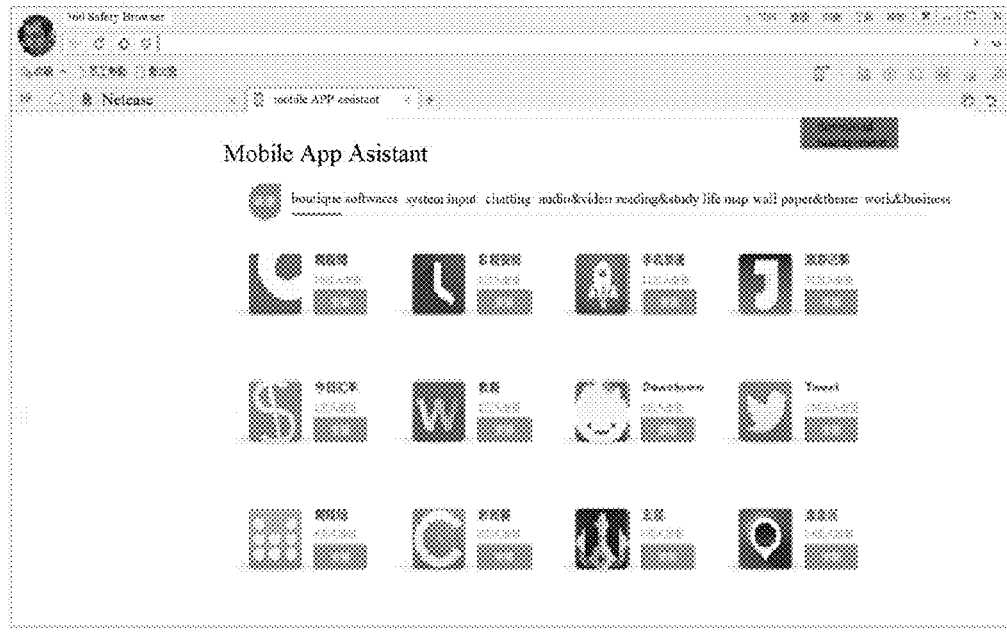
FIG. 15 is another application market subpage acquired from a server-side.

In the process of loading the preset page by the page process, the page process sends a request for acquiring an application market subpage to a server. The server returns the corresponding application market subpage to the page process according to the request sent by the page process; and the page process loads and displays the application market subpage returned by the server-side in an application market area of the preset page. For example, the application market area of the preset page may display applications with a high download frequency recently or display the applications acquired from the server-side according to categories of the applications, for example, displaying according to the categories such as system input, chat communication, audios and videos, reading and learning, living map, wallpaper theme, office business, and the like as shown in FIG. 15.

Step S1403: the page process invoking a first JS interface of the preset page, and the browser master program establishing the data communication channel with the mobile phone assistant by executing a JS program corresponding to the first JS interface.

This step is similar to Step S1102 in the embodiment as shown in FIG. 11, and thus is not unnecessarily elaborated herein.

The above Step S1403 may be executed before Step S1402 or may be synchronously executed with Step S1402.

Step S1404: after the data communication channel is established, the page process invoking a fourth JS interface of the preset page, and the browser master program requesting the mobile phone assistant for application list information of the mobile terminal by executing a JS program corresponding to the fourth JS interface.

After the data communication channel between the browser and the mobile phone assistant is established, the browser master process may detect whether the mobile phone is connected. When the mobile phone has been connected, the browser master process may invoke the AppStore_onConnect( ) interface and notify the page process that the mobile phone has been connected. After receiving a notification, sent by the browser master process, indicating that the mobile phone has been connected, the page process invokes the AppStore_getAppList( ) interface, and the browser master process invokes a third DLL interface provided by the ADB component to request the mobile phone for the application list information of the mobile phone.

Step S1405: after acquiring the application list information of the mobile phone fed back by the mobile phone assistant, the browser master process providing the application list information of the mobile phone for the page process by invoking the fifth JS interface.

After receiving a request sent by the browser master program for acquiring the application list information of the mobile phone, the mobile phone assistant acquires the application list information of the mobile phone from the mobile phone and feds the acquired application list information of the mobile phone back to the browser master process. After acquiring the application list information of the mobile phone fed back by the mobile phone assistant, the browser master process invokes the AppStore_setAppList (string app_list_json) interface, and provides the application list information of the mobile phone for the page process.

Step S1406: the page process loading and displaying the application list information of the mobile phone in a mobile terminal management area of the preset page.

Figure 16:
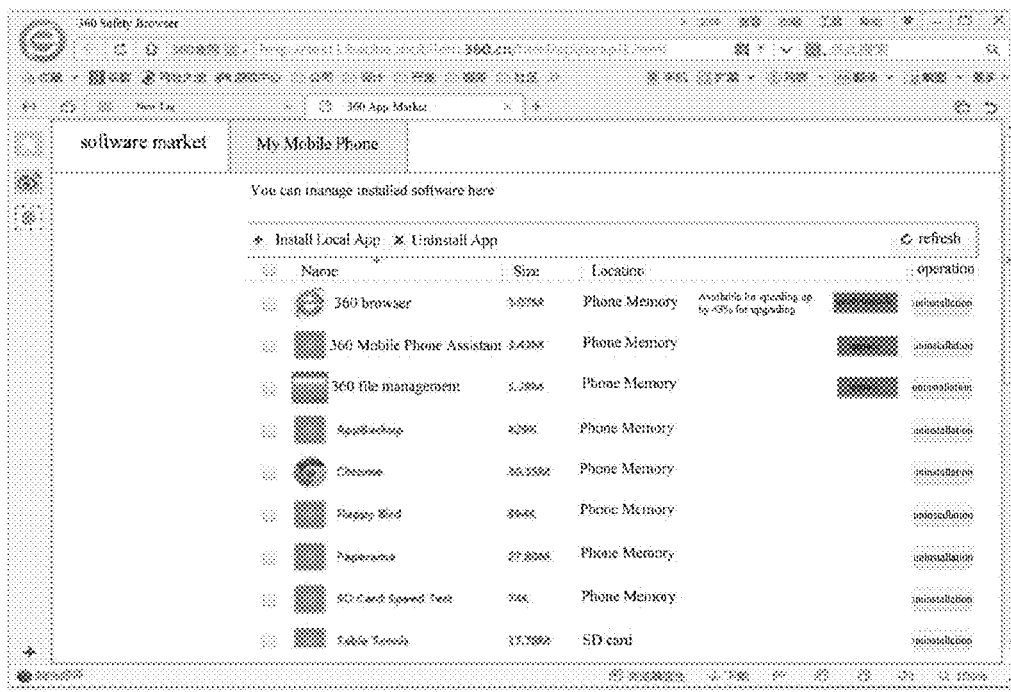
FIG. 16 is storage data information of a mobile terminal displayed in an application market area of another preset page.

The name, size and storage location information of each installed application is displayed in the mobile terminal management area of the preset page, and an uninstallation option of each installed application is loaded and displayed. For an installed application determined to need upgrading according to the version information of the installed application, an upgrade option of the installed application is loaded and displayed. For example, when mobile phone applications acquired by the page process include 360 Browser, 360 Mobile Phone Assistant, 360 File Manager, AppBackup, Chrome, Flappy Bird, Paperama, SD Card Speed Test and Table Tennis, the mobile terminal management area of the preset page is as shown in FIG. 16. However, in the process of loading the application list information of the mobile phone, the mobile terminal management area of the preset page displays "Installed software of the mobile phone is being read, please wait".

Additionally, this embodiment further may be used for determining whether an installed application needs upgrading. Specifically, by comparing version information of the installed application with the version information of the same application in the application market subpage, when the version information of the installed application is identical to the version information of the same application in the application market subpage, the installed application does not need upgrading. However, when the version information of the installed application is not identical to the version information of the same application in the application market subpage, the installed application needs upgrading. At this moment, an "upgrade" option is displayed in the mobile terminal management area. When the user clicks the "upgrade" option, the upgrading is carried out on the application. The "upgrade" option includes speedy upgrading and upgrading. When the application may be upgraded by the way of the speedy upgrading, the page further displays a prompt of "Available for speeding up by xx % for upgrading".

Optionally, this embodiment further may carry out management on the applications in the mobile phone, for instance, upgrading or uninstalling the applications in the mobile phone, or installing, on the mobile phone, the applications displayed on the application market subpage. Specifically, according to the trigger request of the installation/upgrade/uninstallation option of the specified application in the preset page, the page process invokes a sixth JS interface corresponding to installation/update/uninstallation option on the preset page, and transfers the application ID of the specified application to the sixth JS interface. The browser master program sends an operation request for installing/upgrading/uninstalling the specified application to the first transmission tool program by executing a JS program corresponding to the sixth JS interface so that the first transmission tool program sends the operation command for installing/upgrading/uninstalling the specified application to the mobile terminal according to the application ID.

The application ID herein may be an identity of the application, or may be the application name. Each application has a unique application ID, and the application needing to be operated may be recognized according to the application ID. After the user triggers the installation/upgrade/uninstallation option of the specified application in the preset page, the page process invokes the AppStore_installApp(string app_name) installation interface and a corresponding upgrade interface (no specific definition thereof is given herein) or the AppStore_uninstallApp(string app_name) uninstallation interface, and respectively transmits app_name of the specified application to the installation interface, the upgrade interface and the uninstallation interface. The browser master process sends an operation request for installing/upgrading/uninstalling the specified application to the first transmission tool program by executing the JS programs corresponding to the installation interface, the upgrade interface and the uninstallation interface.

This embodiment not only may facilitate the user to operate the mobile phone, but also may display an operation result to the user after the user operates the mobile phone, and timely update a display content of the preset page. After installing/upgrading/uninstalling the specified application by the mobile terminal, the browser master program acquires a notification message, fed back by the first transmission tool program, indicating success or failure in installing/upgrading/uninstalling the specified application, invokes a seventh JS interface, and provides the notification message indicating success or failure in installing/upgrading/uninstalling the specified application for the page process so that the page process updates a display content of the preset page according to the notification message indicating success or failure.

Specifically, the browser master process provides the notification message indicating success or failure in installing/upgrading/uninstalling the specified application by the mobile phone for the page process by invoking the AppStore_setApkInstallStatus(string install_status_json) (the process status notifying interface for installing an application), the process status notifying interface for upgrading an application and the AppStore_setApkUninstallStatus(string uninstall_status_json) (the process status notifying interface for uninstalling an application), so that the page process updates the display content of the preset page according to the notification message indicating success or failure.

In addition, the preset page in this embodiment further may display the updated storage data information of the mobile terminal. Specifically, when update occurs in the storage data information in the mobile terminal, the first transmission tool program actively notifies the browser master process of the updated storage data information in the mobile terminal. The browser master process provides the updated storage data information in the mobile terminal for the page process, so that the page process reloads and displays the preset page according to the updated storage data information in the mobile terminal. In this way, the user may acquire the storage data information in the mobile terminal in real time, and the user is prevented from carrying out unnecessary operation, such as secondary installation.

This embodiment further may be used for detecting whether the mobile terminal has been disconnected. In the case of disconnection, the disconnection may be displayed to the user via the preset page. Specifically, after the mobile terminal disconnects from the first transmission tool program, the browser master program receives a disconnection event message sent by the first transmission tool program, and provides the disconnection event message for the page process so that the page process reloads and displays the preset page according to the disconnection event message. Through the method, when a user network is unstable or the user unconsciously disconnects the mobile terminal from the mobile phone assistant, the user can be quickly and vividly informed of the disconnection. The user, after being informed of the disconnection, may select reconnection or stop subsequent operation, thereby avoiding some meaningless operation caused by failure of timely updating the display content on the preset page after the disconnection. After the mobile phone has been disconnected, the information area of the preset page may display the name of the mobile phone when the mobile phone is connected via a USB cable. However, the desktop snapshot of the mobile phone displays a robot snapshot when the mobile phone is not connected, and the bottom of the information area displays "Manage my mobile phone"; and the application market area displays "Your mobile phone is off-line, please connect your mobile phone to manage the mobile phone applications, and a 'Connect the mobile phone' option is provided in the application market area". When the mobile phone is connected via WIFI, the information area of the preset page may display the name of the mobile phone. However, the desktop snapshot of the mobile phone displays a default picture in a WIFI pattern, and the bottom of the information area displays "Manage my mobile phone"; and the application market area displays "Your authorization is required; for data security of your mobile phone, please click the button below and confirm the authorization on the mobile phone according to prompts; and a 'Read the mobile phone application list' option is provided in the application market area".

In addition, after the data communication channel is established, the browser not only may acquire data in the mobile terminal, but also may transmit abundant data provided by the network side to the mobile terminal. Specifically, the page process has the function of notifying the browser master process to send data to the mobile terminal via the first transmission tool program, wherein the data comprise: URL information of a web page element in a browser loading page, or a downloaded file or a downloaded web page element. The data further comprise: an operating command and an operand for a specified APP in the mobile terminal. The data at the browser side are transmitted to the mobile terminal by using the established data communication channel, thus the defect that data transmission is unavailable between the browser and the mobile terminal and network contents needs to be copied or downloaded and then transferred to the mobile terminal is solved, so that the user may operate the mobile terminal directly via the browser, which facilitates the user, when surfing the Internet via the browser, in directly transferring the network contents acquired from the server to the mobile terminal.

Optionally, in this embodiment, not only the application at the browser side may be installed on the mobile terminal, but also a client-side program corresponding to an APP program in the mobile terminal may be installed at the client-side where the browser is according to the storage data information in the mobile terminal, thereby facilitating the user in installing and using the corresponding client-side program. Specifically, the page process automatically loads, at the browser side, corresponding browser plug-in information according to APP program information in the storage data information in the mobile terminal returned by the first transmission tool program to install a client-side program corresponding to the APP program.

According to the method provided by the above embodiment of the present invention, the data communication channel between the browser and the first transmission tool program is established using a preset page so that direct data transmission is available between the browser and the mobile terminal. The browser may acquire the storage data information in the mobile terminal returned by the first transmission tool program, and load and display the storage data information on the preset page so that a user may view. Through the method, when the user wants to view the storage data information in the mobile terminal in the process of surfing the Internet to browse webpages, the user does not need to switch the program interface and can directly view the storage data information on the preset page via a trigger button provided by the browser, so that the operation is convenient. The page process invokes the JS interface according to the browser master program, which may quickly display the storage data information in the mobile terminal in real time, thereby facilitating the user in carrying out corresponding operation on the storage data information in the mobile terminal.

Figure 17:
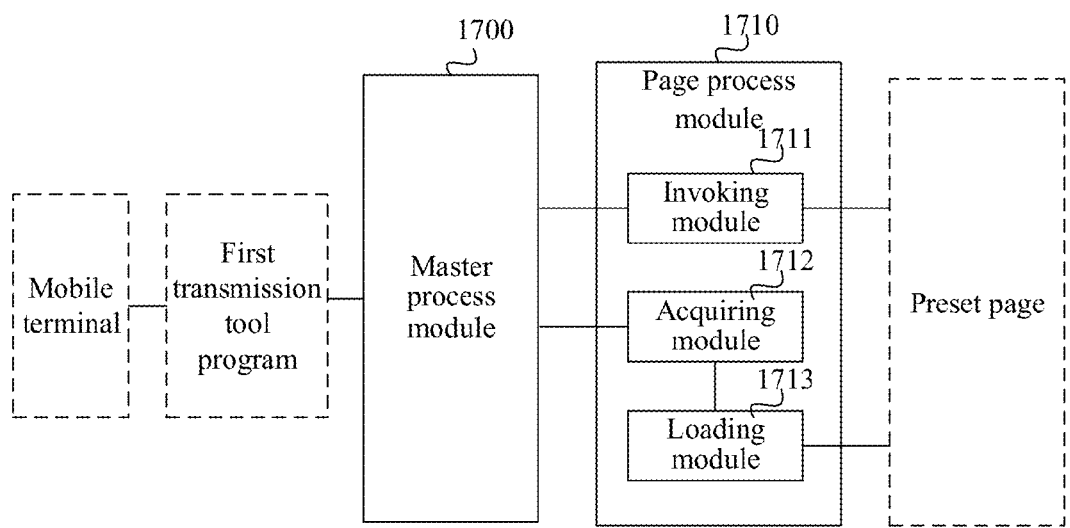
FIG. 17 is a structural block diagram of a browser apparatus according to another embodiment of the present invention.

FIG. 17 illustrates a schematic structural diagram of a browser apparatus according to still another embodiment of the present invention. The browser apparatus carries out data communications with the mobile terminal by means of a first transmission tool program installed on a client-side where the browser apparatus is. As shown in FIG. 17, the browser apparatus includes: a master process module 1700 running a browser master program and a second page process module 1710 running a page process, wherein the second page process module 1710 includes: a second invoking module 1711, a second acquiring module 1712 and a second loading module 1713.

The master process module 1700 is configured to: trigger, at a browser side, a read request for reading storage data information and/or device information in a mobile terminal bound to the browser; start a page process to load a preset page, and establish a data communication channel with the first transmission tool program according to a notification of the page process module.

The second invoking module 1711 is configured to notify the master process module to request the first transmission tool program for the storage data information and/or the device information in the mobile terminal.

The second acquiring module 1712 is configured to acquire the storage data information and/or the device information in the mobile terminal transmitted by the master process module and returned by the first transmission tool program.

The storage data information in the mobile terminal includes application list information of the mobile terminal, wherein the application list information includes a plurality of data items, each of the data items carrying information of an installed application in the mobile phone. Each of the data items carrying information of an installed application in the mobile terminal further includes: name and version information and size and storage location information of the installed application. The device information of the mobile terminal includes status information of the mobile terminal and desktop snapshot of the mobile terminal. The status information of the mobile terminal includes one or more of: a name and a model of the mobile terminal, total storage amount information and remaining storage amount information of the mobile terminal, and SD card information of the mobile terminal.

The second loading module 1713 is configured to load and display the storage data information and/or the device information in the mobile terminal on the preset page.

Optionally, the second invoking module 1711 is further configured to invoke a first JS interface of the preset page.

The master process module 1700 is further configured to establish the data communication channel with the first transmission tool program by executing a JS program corresponding to the first JS interface.

The master process module 1700 is further configured to request the first transmission tool program for the device information of the connected or bound mobile terminal according to the notification of the page process module.

The second loading module 1713 is further configured to display the device information of the connected or bound mobile terminal on the preset page so that a user at the browser side selects the mobile terminal for data transmission.

The second invoking module 1711 is further configured to invoke a second JS interface of the preset page.

The master process module 1700 is further configured to request the first transmission tool program for the status information of the mobile terminal and the desktop snapshot of the mobile terminal by executing a JS program corresponding to the second JS interface; and invoke, after acquiring the status information of the mobile terminal and the desktop snapshot of the mobile terminal returned by the first transmission tool program, a third JS interface of the preset page, and provide the status information of the mobile terminal and the desktop snapshot of the mobile terminal for the acquiring module.

The second loading module 1713 is further configured to load and display the status information of the mobile terminal and the desktop snapshot of the mobile terminal in an information area of the preset page.

According to the browser apparatus provided by the above embodiment of the present invention, the data communication channel between the browser and the first transmission tool program is established using a preset page so that direct data transmission is available between the browser and the mobile terminal. The browser may acquire the device information in the mobile terminal returned by the first transmission tool program, and load and display the device information on the preset page so that a user may view. By using the browser apparatus, when the user wants to view the device information in the mobile terminal in the process of surfing the Internet to browse webpages, the user does not need to switch the program interface and can directly view the device information on the preset page via a trigger button provided by the browser, so that the operation is convenient. By displaying the device information of the mobile terminal in the information area of the preset page and performing real-time update on the device information of the mobile terminal, the device information of the mobile terminal may be mastered conveniently in real time, thereby facilitating the user in operating the mobile terminal, and avoiding the defect of useless operation of the user due to insufficient storage amount of the mobile terminal.

Figure 18:
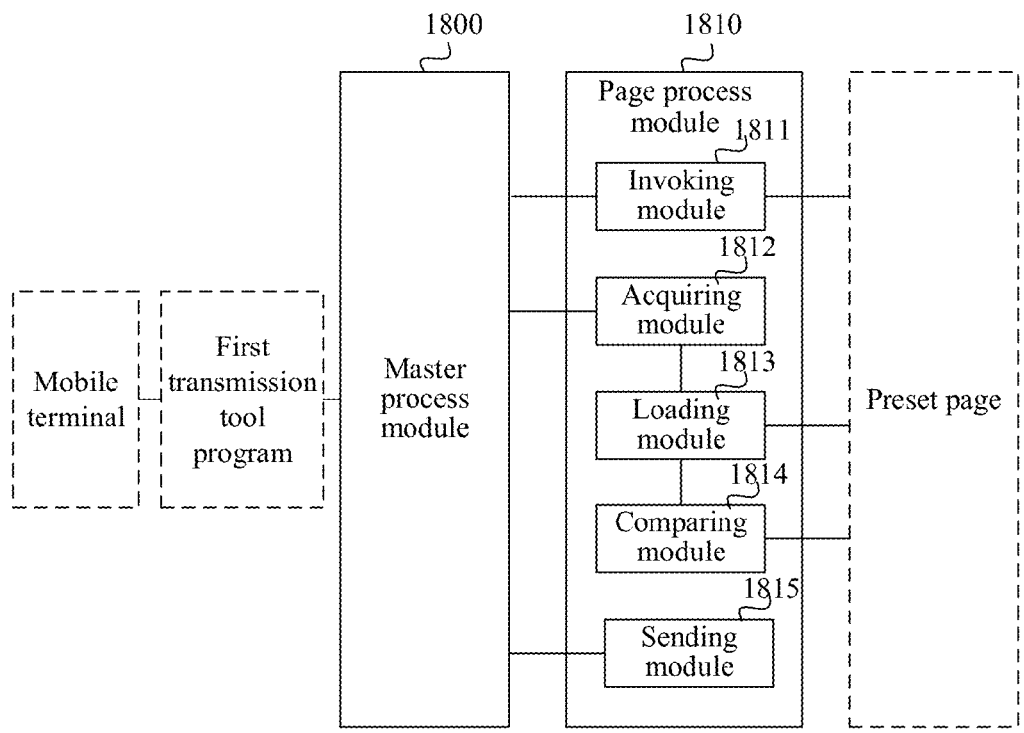
FIG. 18 is a structural block diagram of a browser apparatus according to still another embodiment of the present invention.

FIG. 18 illustrates a structural block diagram of a browser apparatus according to still another embodiment of the present invention. As shown in FIG. 18, the browser apparatus includes: a master process module 1800 running a browser master program and a page process module 1810 running a page process, wherein the second page process module 1810 includes: a second invoking module 1811, a second acquiring module 1812, a second loading module 1813, a second comparing module 1814 and a second sending module 1815.

The master process module 1800 is configured to: trigger, at a browser side, a read request for reading storage data information in a mobile terminal bound to the browser; start a page process to load a preset page, and establish a data communication channel with the first transmission tool program according to a notification of the page process module.

The second invoking module 1811 is configured to notify the master process module to request the first transmission tool program for the storage data information in the mobile terminal.

The second acquiring module 1812 is configured to acquire the storage data information in the mobile terminal transmitted by the master process module and returned by the first transmission tool program.

The second loading module 1813 is configured to load and display the storage data information in the mobile terminal on the preset page.

Optionally, the second invoking module 1811 is further configured to invoke a fourth JS interface of the preset page.

The master process module 1800 is further configured to: request the first transmission tool program for application list information of the mobile terminal by executing a JS program corresponding to the fourth JS interface; and invoke, after acquiring the application list information of the mobile terminal fed back by the first transmission tool program, a fifth JS interface of the preset page, and provide the application list information of the mobile terminal for the acquiring module.

The second loading module 1813 further is configured to load and display the application list information of the mobile terminal in a mobile terminal management area of the preset page.

The second loading module 1813 is further configured to: display name, size and storage location information of each installed application in the mobile terminal management area of the preset page, and load and display an uninstallation option of each installed application; and load and display, for an installed application determined to need upgrading according to the version information of the installed application, an upgrade option of the installed application.

The second loading module 1813 is further configured to: load the preset page, and display an application market subpage requested from a server-side in an application market area of the preset page.

The second page process module 1810 further comprises: a second comparing module 1814, configured to compare the version information of the installed application with version information of the same application in the application market subpage to determine whether the installed application needs upgrading.

The second invoking module 1811 is further configured to invoke a sixth JS interface corresponding to an installation/upgrade/uninstallation option of the preset page according to a triggered request of the installation/upgrade/uninstallation option of a specified application in the preset page, and transfer an application ID of the specified application to the sixth JS interface.

The master program module 1800 is further configured to: send an operation request for installing/upgrading/uninstalling the specified application to the first transmission tool program by executing a JS program corresponding to the sixth JS interface so that the first transmission tool program sends the operation request for installing/upgrading/uninstalling the specified application to the mobile terminal according to the application ID.

The master process module 1800 is further configured to: acquire a notification message indicating success or failure in installing/upgrading/uninstalling the specified application fed back by the first transmission tool program, invoke a seventh JS interface of the preset page, and provide the notification message indicating success or failure in installing/upgrading/uninstalling the specified application for the acquiring module.

The second loading module 1813 is further configured to update a display content of the preset page according to the notification message indicating success or failure.

The master process module 1800 is further configured to: receive the updated storage data information and/or the device information in the mobile terminal actively notified by the first transmission tool program when update occurs in the storage data information and/or the device information in the mobile terminal; and provide the updated storage data information and/or the device information in the mobile terminal for the acquiring module.

The second loading module 1813 is further configured to reload and display the preset page according to the updated storage data information and/or the device information in the mobile terminal.

The master process module 1800 is further configured to: receive a disconnection event message sent by the first transmission tool program after the mobile terminal disconnects from the first transmission tool program; and provide the disconnection event message for the acquiring module.

The second loading module 1813 is further configured to reload and display the preset page according to the disconnection event message.

The second page process module 1810 further comprises: a second sending module 1815, configured to notify the master process module to send data to the mobile terminal by means of the first transmission tool program, wherein the data comprise: URL information of a web page element in a browser loading page, or a downloaded file or a downloaded web page element. The data further comprise: an operating command and an operand for a specified APP in the mobile terminal.

The master process module 1800 is further configured to: automatically load, at the browser side, corresponding browser plug-in information according to APP program information in the storage data information in the mobile terminal returned by the first transmission tool program to install a client-side program corresponding to the APP program.

According to the browser apparatus provided by the above embodiment of the present invention, the data communication channel between the browser and the first transmission tool program is established using a preset page so that direct data transmission is available between the browser and the mobile terminal. The browser may acquire the storage data information in the mobile terminal returned by the first transmission tool program, and load and display the storage data information on the preset page so that a user may view. By using the browser apparatus, when the user wants to view the storage data information in the mobile terminal in the process of surfing the Internet to browse webpages, the user does not need to switch the program interface and can directly view the storage data information on the preset page via a trigger button provided by the browser, so that the operation is convenient. The page process invokes the JS interface according to the browser master program, which may quickly display the storage data information in the mobile terminal in real time, thereby facilitating the user in carrying out corresponding operation on the storage data information in the mobile terminal.

Algorithm and display provided herein are not inherently related to a particular computer, virtual system or other equipment. Various general systems may also be used with the teaching based on the present invention. According to the above description, the required structure for constructing such a system is obvious. In addition, the present invention is not directed to any particular programming language. It should be understood that a variety of programming languages can be used to implement the disclosed contents as described herein and above description to the particular programming language is to disclose the best inventive implementation mode.

Many details are discussed in the specification provided herein. However, it should be understood that the embodiments of the present invention can be implemented without these specific details. In some examples, the well-known methods, structures and technologies are not shown in detail so as to avoid an unclear understanding of the description.

Similarly, it should be understood that, in order to simplify the present invention and to facilitate the understanding of one or more of various aspects thereof, in the above description of the exemplary embodiments of the present invention, various features of the present invention may sometimes be grouped together into a single embodiment, accompanying figure or description thereof. However, the method of this present invention should not be constructed as follows: the present invention for which the protection is sought claims more features than those explicitly disclosed in each of claims. More specifically, as reflected in the following claims, the inventive aspect is in that the features therein are less than all features of a single embodiment as disclosed above. Therefore, claims following specific embodiments are definitely incorporated into the specific embodiments, wherein each of claims can be considered as a separate embodiment of the present invention.

It should be understood by those skilled in the art that modules of the device in the embodiments can be adaptively modified and arranged in one or more devices different from the embodiment. Modules, units or components in the embodiment can be combined into one module, unit or component, and also can be divided into more sub-modules, sub-units or sub-components. Except that at least some of features and/or processes or units are mutually exclusive, various combinations can be used to combine all the features disclosed in specification (including claims, abstract and accompanying figures) and all the processes or units of any methods or devices as disclosed herein. Unless otherwise definitely stated, each of features disclosed in specification (including claims, abstract and accompanying figures) may be taken place with an alternative feature having same, equivalent or similar purpose.

In addition, it should be understood by those skilled in the art, although some embodiments as discussed herein comprise some features included in other embodiment rather than other feature, combination of features in different embodiment means that the combination is within a scope of the present invention and forms the different embodiment. For example, in the claims, any one of the embodiments for which the protection is sought can be used in any combination manner.

Each of devices according to the embodiments of the present invention can be implemented by hardware, or implemented by software modules operating on one or more processors, or implemented by the combination thereof. A person skilled in the art should understand that, in practice, a microprocessor or a digital signal processor (DSP) may be used to realize some or all of the functions of some or all of the parts in the browser apparatus according to the embodiments of the present invention. The present invention may further be implemented as equipment or device program (for example, computer program and computer program product) for executing some or all of the methods as described herein. Such program for implementing the present invention may be stored in the computer readable medium, or have a form of one or more signals. Such a signal may be downloaded from the Internet websites, or be provided on a carrier signal, or provided in any other form.

Figure 19:
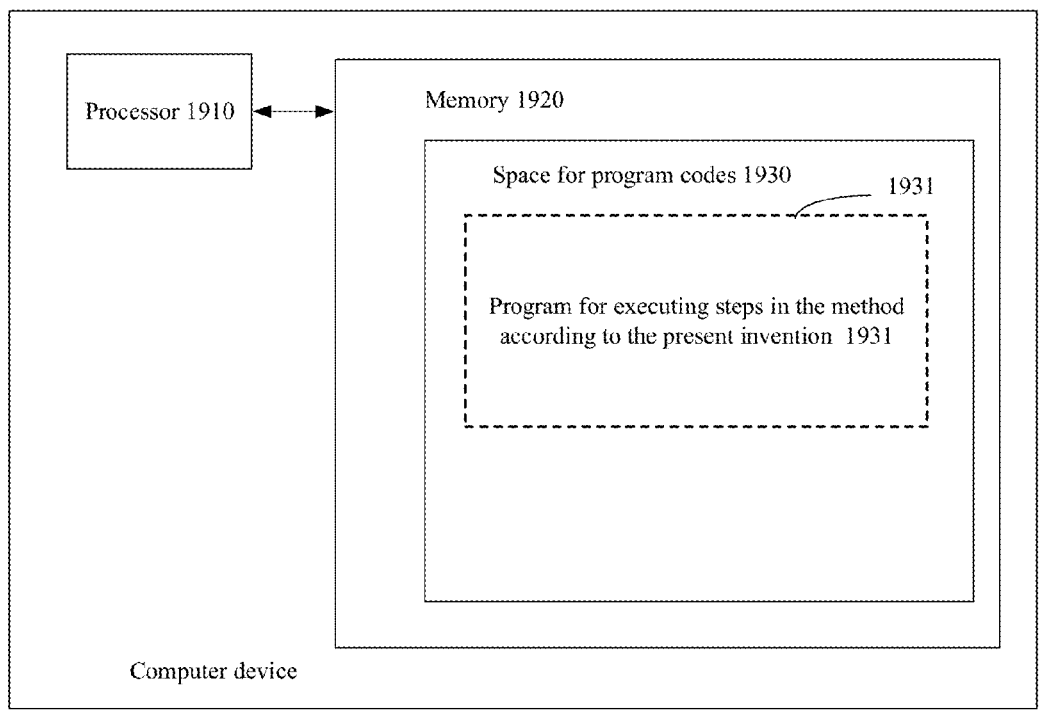
FIG. 19 is a block diagram showing a computer device for executing the method for performing communication between a browser and a mobile terminal according to the present invention.
Figure 20:
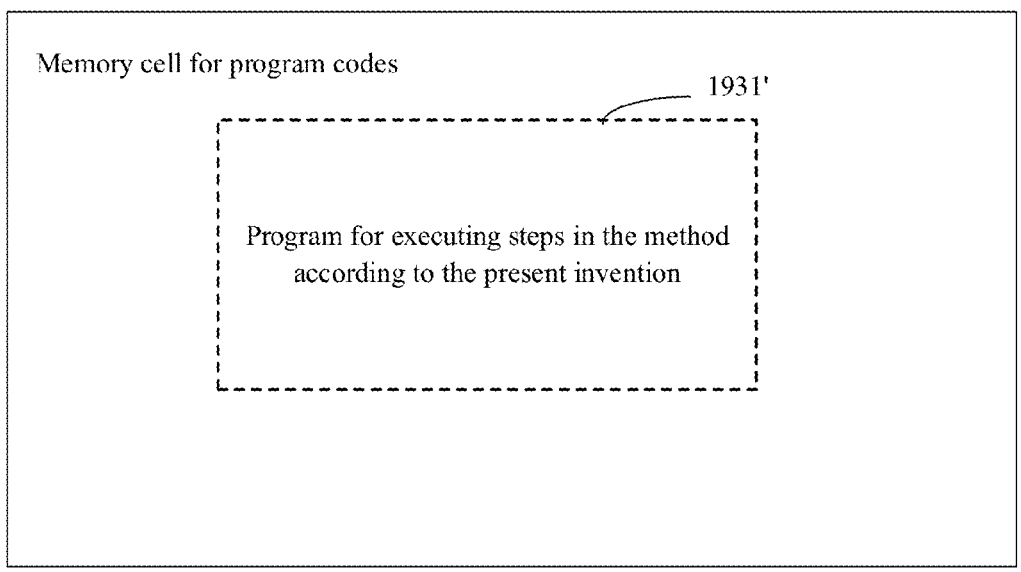
FIG. 20 is a memory cell for maintaining or carrying a program code for implementing the method for performing communication between a browser and a mobile terminal according to the present invention.

For example, FIG. 19 illustrates a computer device that may implement the method for performing communication between a browser and a mobile terminal according to the present invention. Traditionally, the computer device includes a processor 1910 and a computer program product or a computer readable medium in form of a memory 1920. The memory 1920 may be electronic memories such as flash memory, EEPROM (Electrically Erasable Programmable Read—Only Memory), EPROM, hard disk or ROM. The memory 1920 has a memory space 1930 for executing program codes 1931 of any steps in the above methods. For example, the memory space 1930 for program codes may include respective program codes 1931 for implementing the respective steps in the method as mentioned above. These program codes may be read from and/or be written into one or more computer program products. These computer program products include program code carriers such as hard disk, compact disk (CD), memory card or floppy disk. These computer program products are usually the portable or stable memory cells as shown in reference FIG. 20. The memory cells may be provided with memory sections, memory spaces, etc., similar to the memory 1920 of the computer device as shown in FIG. 19. The program codes may be compressed for example in an appropriate form. Usually, the memory cell includes computer readable codes 1931' which can be read for example by processors 1910. When these codes are operated on the computer device, the computer device may execute respective steps in the method as described above.

"One embodiment", "embodiments" or "one or more embodiments" herein means that particular features, structures or characteristics described in combination with the embodiments are included at least one embodiment of the present invention. Furthermore, it is to be noted that the term "in one embodiment" herein does not necessarily refers to the same embodiment.

It should be noted that the above-described embodiments are intended to illustrate but not to limit the present invention, and alternative embodiments can be devised by a person skilled in the art without departing from the scope of claims as appended. In the claims, no reference mark between round brackets shall impose restriction on the claims. The word "include/comprise" does not exclude a component or step not listed in the claims. The wording "a" or "an" in front of an element does not exclude the presence of a plurality of such elements. The present invention may be realized by means of hardware comprising a number of different components and by means of a suitably programmed computer. In the unit claim listing a plurality of devices, some of these devices may be embodied in the same hardware. The wordings "first", "second", and "third", etc. do not denote any order. These wordings can be construed as naming.

Also, it should be noticed that the language used in the present specification is chosen for the purpose of readability and teaching, rather than explaining or defining the subject matter of the present invention. Therefore, it is apparent to an ordinary skilled person in the art that modifications and variations could be made without departing from the scope and spirit of the claims as appended. For the scope of the present invention, the publication of the present invention is illustrative rather than restrictive, and the scope of the present invention is defined by the appended claims.

What is claimed is:

1. A method for performing communications between a browser and a remote mobile terminal via a first transmission tool program, wherein the browser and the first transmission tool program are installed on a computing device, and the method comprises:

triggering, via a user interface element provided by the browser, a request for information stored in the remote mobile terminal;

starting a page process to load a preset page on the computing device;

notifying, by the page process, a browser master program to establish a data communication channel with the first transmission tool program;

after the data communication channel is established, notifying, by the page process, the first transmission tool program to transmit the request for the information stored in the remote mobile terminal to the remote mobile terminal;

receiving, by the first transmission tool program, the information from the remote mobile terminal;

transmitting, by the first transmission tool program and the browser master program, the information to the page process;

acquiring, by the page process, information; and loading and displaying the information on the preset page.

2. The method according to claim 1, wherein after the data communication channel is established, notifying, by the page process, the first transmission tool program to transmit the request for the information in the remote mobile terminal further comprises: the page process notifying the browser master program to request the first transmission tool program for device information of the remote mobile terminal; and loading and displaying the information in the remote mobile terminal on the preset page further comprises: the page process displaying the device information of the remote mobile terminal on the preset page so that a user of the computing device selects the remote mobile terminal for data transmission.

3. The method according to claim 2, wherein the device information of the remote mobile terminal comprises status information of the remote mobile terminal and desktop snapshot of the remote mobile terminal;

notifying, by the page process, the browser master program to request the first transmission tool program for the device information in the remote mobile terminal specifically comprises: the page process invoking a second JavaScript (JS) interface of the preset page, and the browser master program requesting the first transmission tool program for status information of the remote mobile terminal and desktop snapshot of the remote mobile terminal by executing a JS program corresponding to the second JS interface; and acquiring, by the page process, the device information in the remote mobile terminal transmitted by the browser master program and returned by the first transmission tool program, and loading and displaying the device information on the preset page specifically comprises: after acquiring the status information of the remote mobile terminal and the desktop snapshot of the remote mobile terminal returned by the first transmission tool program, the browser master program invoking a third JS interface of the preset page, and providing the status information of the remote mobile terminal and the desktop snapshot of the remote mobile terminal for the page process; and the page process loading and displaying the status information of the remote mobile terminal and the desktop snapshot of the remote mobile terminal in an information area of the preset page.

4. The method according to claim 1, wherein the information stored in the remote mobile terminal comprises storage data information in the remote mobile terminal, the storage data information in the remote mobile terminal further comprises application list information of the remote mobile terminal; the application list information comprises a plurality of data items, each of the data items carries information of an installed application in the remote mobile terminal;

notifying, by the page process, the browser master program to request the first transmission tool program for the storage data information in the remote mobile terminal specifically comprises: the page process invoking a fourth JavaScript (JS) interface of the preset page, and the browser master program requesting the first transmission tool program for application list information of the remote mobile terminal by executing a JS program corresponding to the fourth JS interface; and acquiring, by the page process, the storage data information in the remote mobile terminal transmitted by the browser master program and returned by the first transmission tool program, and loading and displaying the storage data information on the page specifically comprises: after acquiring the application list information of the remote mobile terminal fed back by the first transmission tool program, the browser master program invoking a fifth JS interface of the preset page, providing the application list information of the remote mobile terminal for the page process; and the page process loading and displaying the application list information of the remote mobile terminal in a remote mobile terminal management area of the preset page.

5. The method according to claim 4, wherein each of the data items carrying information of an installed application in the remote mobile terminal comprises: name and version information and size and storage location information of the installed application; and the page process loading and displaying the application list information of the remote mobile terminal in a remote mobile terminal management area of the preset page specifically comprises: displaying name, size and storage location information of each installed application in the remote mobile terminal management area of the preset page, and loading and displaying an uninstallation option of each installed application; and for an installed application determined to need upgrading according to the version information of the installed application, loading and displaying an upgrade option of the installed application.

6. The method according to claim 1, after loading and displaying the information on the preset page, the method further comprises:

the page process invoking a sixth JS interface corresponding to an installation/upgrade/uninstallation option of the preset page according to a triggered request of the installation/upgrade/uninstallation option of a specified application in the preset page; and the browser master program sending an operation request for installing/upgrading/uninstalling the specified application to the first transmission tool program by executing a JS program corresponding to the sixth JS interface so that the first transmission tool program sends the operation request for installing/upgrading/uninstalling the specified application to the remote mobile terminal according to the application ID;

after installing/upgrading/uninstalling the specified application in the remote mobile terminal, the method further comprises: the browser master program acquiring a notification message, fed back by the first transmission tool program, indicating success or failure in installing/upgrading/uninstalling the specified application, invoking a seventh JS interface of the preset page, and providing the notification message indicating success or failure in installing/upgrading/uninstalling the specified application for the page process so that the page process updates a display content of the preset page according to the notification message indicating success or failure.

7. The method according to claim 1, wherein after loading and displaying the information on the preset page, the method further comprises:

when update occurs in the information in the remote mobile terminal, the first transmission tool program actively notifying the update of the information to the browser master program; and the browser master program providing the updated information in the remote mobile terminal for the page process so that the page process reloads and displays the updated information on the preset page.

8. The method according to claim 1, wherein after loading and displaying the information on the preset page, the method further comprises:

after the remote mobile terminal disconnects from the first transmission tool program, the browser master program receiving a disconnection event message sent by the first transmission tool program; and the browser master program providing the disconnection event message for the page process so that the page process reloads and displays the preset page according to the disconnection event message.

9. The method according to claim 1, further comprising: after the data communication channel is established, the page process notifying the browser master program to send data to the remote mobile terminal by means of the first transmission tool program, wherein the data comprise: URL information of a web page element in a browser loading page, or a downloaded file or a downloaded web page element.

10. The method according to claim 1, wherein after the page process acquires the information in the remote mobile terminal transmitted by the browser master program and the first transmission tool program, the method further comprises:

the page process loading, at the browser side, corresponding browser plug-in information according to application program information in the remote mobile terminal transmitted by the first transmission tool program to install a program corresponding to the application program on the computing device.

11. A computing device comprising:
a memory having instructions stored thereon;
a processor configured to execute the instructions to perform operations for data communications between a browser and a remote mobile terminal by means of a first transmission tool program, wherein the browser and the first transmission tool program are installed on the computing device and the operations comprising:

triggering, via a user interface element provided by the browser, a request for information stored in the remote mobile terminal;

starting a page process to load a preset page on the computing device;

establishing a data communication channel with the remote mobile terminal via the first transmission tool program according to a notification of the page process;

notifying, by the page process, the first transmission tool program to transmit the request for the information stored in the remote mobile terminal to the remote mobile terminal;

receiving, by the first transmission tool program, the information from the remote mobile terminal;

transmitting, by the first transmission tool program and a browser master program of the browser, the information to the page process;

acquiring, by the page process, the; and loading and displaying the information on the preset page.

12. The browser apparatus according to claim 11, wherein the operation of notifying, by the page process, the first transmission tool program to transmit the request for the information in the remote mobile terminal further comprises:

the page process notifying the browser master program to request the first transmission tool program for device information of the remote mobile terminal; and loading and displaying the information in the remote mobile terminal on the preset page further comprises: the page process displaying the device information of the remote mobile terminal on the preset page so that a user of the computing device selects the remote mobile terminal for data transmission.

13. The browser apparatus according to claim 12, wherein the device information of the remote mobile terminal comprises status information of the remote mobile terminal and desktop snapshot of the remote mobile terminal;

the operation of notifying, by the page process, the browser master program to request the first transmission tool program for the device information in the remote mobile terminal specifically comprises: the page process invoking a second Script (JS) interface of the preset page, and the browser master program requesting the first transmission tool program for the status information of the remote mobile terminal and the desktop snapshot of the remote mobile terminal by executing a JS program corresponding to the second JS interface; acquiring, by the page process, the device information in the remote mobile terminal transmitted by the browser master program and returned by the first transmission tool program, and loading and displaying the device information on the preset page specifically comprises: after acquiring the status information of the remote mobile terminal and the desktop snapshot of the remote mobile terminal returned by the first transmission tool program, the browser master program invoking a third JS interface of the preset page, and providing the status information of the remote mobile terminal and the desktop snapshot of the remote mobile terminal for the page process and the page process loading and displaying the status information of the remote mobile terminal and the desktop snapshot of the remote mobile terminal in an information area of the preset page.

14. The browser apparatus according to claim 11, wherein the information stored in the remote mobile terminal comprises storage data information in the remote mobile terminal, the storage data information in the remote mobile terminal further comprises application list information of the remote mobile terminal; the application list information comprises a plurality of data items, each of the data items carries information of an installed application in the remote mobile terminal;

the operation of notifying, by the page process, the browser master program to request the first transmission tool program for the storage data information in the remote mobile terminal specifically comprises: the page process invoking a fourth JavaScript (JS) interface of the preset page;

and the browser master program requesting the first transmission tool program for application list information of the remote mobile terminal by executing a JS program corresponding to the fourth JS interface; and acquiring, by the page process, the storage data information in the remote mobile terminal transmitted by the browser master program and returned by the first transmission tool program, and loading and displaying the storage data information on the page specifically comprises: after acquiring the application list information of the remote mobile terminal fed back by the first transmission tool program, the browser master program invoking a fifth JS interface of the preset page, and providing the application list information of the remote mobile terminal for the page process; and the page process loading and displaying the application list information of the remote mobile terminal in a remote mobile terminal management area of the preset page.

15. The browser apparatus according to claim 11, wherein the operations further comprise: the page process invoking a sixth JS interface corresponding to an installation/upgrade/uninstallation option of the preset page according to a triggered request of the installation/upgrade/uninstallation option of a specified application in the preset page; and the browser master program sending an operation request for installing/upgrading/uninstalling the specified application to the first transmission tool program by executing a JS program corresponding to the sixth JS interface so that the first transmission tool program sends the operation request for installing/upgrading/uninstalling the specified application to the remote mobile terminal according to the application ID;

the browser master program acquiring a notification message indicating success or failure in installing/upgrading/uninstalling the specified application fed back by the first transmission tool program, invoking a seventh JS interface of the preset page, and providing the notification message indicating success or failure in installing/upgrading/uninstalling the specified application for the page process so that the page process updates a display content of the preset page according to the notification message indicating success or failure.

16. The browser apparatus according to claim 11, wherein the operations further comprise: when update occurs in information in the remote mobile terminal, the first transmission tool program actively notifying the updated of information in the remote mobile terminal to the browser master program; and the browser master program providing the updated information in the remote mobile terminal for the page process so that the page process reloads and displays the updated information on the preset page.

17. The browser apparatus according to claim 11, wherein the operations further comprise: the browser master program receiving a disconnection event message sent by the first transmission tool program after the remote mobile terminal disconnects from the first transmission tool program; and the browser master program providing the disconnection event message for the page process so that the page process reloads and displays the preset page according to the disconnection event message.

18. The browser apparatus according to claim 11, wherein the operations further comprise: the page process notifying the browser master program to send data to the remote mobile terminal by means of the first transmission tool program, wherein the data comprise: URL information of a web page element in a browser loading page, or a downloaded file or a downloaded web page element.

19. The browser apparatus according to claim 11, wherein the operations further comprise: the page process loading, at the browser side, corresponding browser plug-in information according to application program information in the remote mobile terminal transmitted by the first transmission tool program to install a program corresponding to the application program on the computing device.

20. A non-transitory computer-readable medium having computer programs stored thereon that, when executed by one or more processors of a computing device, cause the computing device to perform operations for data communication between a browser and a remote mobile terminal by means of a first transmission tool program, wherein the browser and the first transmission tool program are installed on the computing device, and the operations comprising:

triggering, via a user interface element provided by the browser, a request for information stored in the remote mobile terminal;

starting a page process to load a preset page on the computing device;

notifying, via a user interface element provided by the page process, a browser master program to establish a data communication channel with the first transmission tool program;

after the data communication channel is established, notifying, by the page process, the first transmission tool program to transmit the request for the information stored in the remote mobile terminal to the remote mobile terminal;

receiving, by the first transmission tool program, the information from the remote mobile terminal;

transmitting, by the first transmission tool program and the browser master program, the information to the page process;

acquiring, by the page process, the information; and loading and displaying the information on the preset page.

\* \* \* \* \*